ary(12) United States Patent
Hosman et al.

(10) Patent No.: US 11,072,669 B2
(45) Date of Patent: Jul. 27, 2021

(54) HIGH PRESSURE, FREE RADICAL POLYMERIZATIONS TO PRODUCE ETHYLENE-BASED POLYMERS

(71) Applicant: Dow Global Technologies LLC, Midland, MI (US)

(72) Inventors: Cornelis J F Hosman, Ijzendijke (NL); Nhi T. Y. Dang, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/619,297

(22) PCT Filed: Jun. 26, 2018

(86) PCT No.: PCT/US2018/039525
§ 371 (c)(1),
(2) Date: Dec. 4, 2019

(87) PCT Pub. No.: WO2019/005812
PCT Pub. Date: Jan. 3, 2019

(65) Prior Publication Data
US 2020/0140580 A1 May 7, 2020

Related U.S. Application Data

(60) Provisional application No. 62/526,003, filed on Jun. 28, 2017.

(51) Int. Cl.
*C08F 10/02* (2006.01)
*C08F 2/01* (2006.01)
(Continued)

(52) U.S. Cl.
CPC .............. *C08F 10/02* (2013.01); *B01J 4/001* (2013.01); *B01J 19/0013* (2013.01);
(Continued)

(58) Field of Classification Search
CPC ... C08F 10/02; C08F 2/01; B01J 4/001; B01J 19/0013; B01J 19/2415; B01J 2204/002
(Continued)

(56) References Cited

U.S. PATENT DOCUMENTS 3,334,081 A    8/1967  Madgwick et al.
3,917,577 A   11/1975  Trieschmann et al.
(Continued)

FOREIGN PATENT DOCUMENTS

DE    1795365 A1   1/1972
DE    3227746 A1   1/1984
(Continued)

OTHER PUBLICATIONS

Ehrlich et al., "Fundamentals of Free-radical Polymerization of Ethylene", Adv. Polymer Science, 1970, vol. 7, pp. 386-448.
(Continued)

*Primary Examiner* — William K Cheung
(74) *Attorney, Agent, or Firm* — Dinsmore & Shohl LLP

(57) ABSTRACT

A process to form an ethylene-based polymer in a reactor system, said process comprising at least the following steps: a) injecting a first initiator mixture into the tubular reactor at location L along the reactor, b) injecting a compressed make-up CTA system at the location $L_1$, at a distance ($L-L_1$) from $145*D_{prehehater}$ to $1000*D_{preheater}$, upstream from L, and wherein $D_{preheater}$=the inner diameter of the pre-heater in meter (m); and wherein $L_1$ is located in the preheater, and c) optionally, injecting one or more additional compressed make-up CTA system(s) into the preheater, at one or more location: $L_iL_{i+1}$, $L_n$ ($2 \leq i$ and $2 \leq n$), upstream from $L_1$, and each location is, independently, at a distance from $145*D_{prehehater}$ to $1000*D_{preheater}$, and wherein n equals the total number of injection locations of the make-up CTA system(s) injected into the preheater, upstream from $L_1$, and wherein
(Continued)

$(L-L_1)$ is less than each $(L-L_i)$, $(L-L_{i+1})$, $(L-L_n)$; and d) polymerizing a reaction mixture comprising at least ethylene, the first initiator mixture, and the compressed make-up CTA system of step b), and wherein the process has a log coefficient of variation $(\log(CoV_1))$, at $L_1$, that meets the relationships described herein.

10 Claims, 4 Drawing Sheets

(51) Int. Cl.
  *B01J 4/00* (2006.01)
  *B01J 19/00* (2006.01)
  *B01J 19/24* (2006.01)
(52) U.S. Cl.
  CPC ............ *B01J 19/2415* (2013.01); *C08F 2/01* (2013.01); *B01J 2204/002* (2013.01)
(58) Field of Classification Search
  USPC .......................................................... 526/64
  See application file for complete search history.

(56) References Cited

U.S. PATENT DOCUMENTS

| | | |
|---|---|---|
| 6,569,962 B1 | 5/2003 | Zschoch et al. |
| 6,677,408 B1 | 1/2004 | Mahling et al. |
| 8,119,752 B2 | 2/2012 | Mahling et al. |
| 8,822,601 B2 | 9/2014 | Karjala et al. |
| 9,765,160 B2 | 9/2017 | Den Doelder et al. |
| 9,809,701 B2 | 11/2017 | den Doelder et al. |
| 9,828,496 B2 | 11/2017 | den Doelder et al. |
| 2003/0114607 A1 | 6/2003 | Donck |
| 2010/0093961 A1 | 4/2010 | Aerts et al. |
| 2016/0137822 A1 | 5/2016 | den Doelder et al. |
| 2017/0152329 A1* | 6/2017 | Auger .................... C08F 10/02 |

FOREIGN PATENT DOCUMENTS

| | | |
|---|---|---|
| DE | 276598 A3 | 3/1990 |
| WO | 0168723 A2 | 9/2001 |
| WO | 0214379 A1 | 2/2002 |
| WO | 2007135038 A1 | 11/2007 |
| WO | 2010003650 A1 | 1/2010 |
| WO | 2012044503 A1 | 4/2012 |
| WO | 2013078018 A2 | 5/2013 |
| WO | 2016022225 A1 | 2/2016 |
| WO | 2016109266 A1 | 7/2016 |
| WO | 2017058570 A1 | 4/2017 |
| WO | 2017083552 A1 | 5/2017 |
| WO | 2017083563 A1 | 5/2017 |
| WO | 2017146981 A1 | 8/2017 |
| WO | 2017201110 A1 | 11/2017 |

OTHER PUBLICATIONS

Luft, G., "Hochdruck-Polyaethylen", Chem.-Ing.-Tech., 1979, vol. 51 Nr. 10, pp. 960-969.
Van Der Molen et al., "The Effect of Imperfect Mixing on the Initiator Productivity in the High Pressure Radical Polymerization of Ethylene", Advances in Chemistry Series, Chem. React. Eng., 1972.
Mortimer, G., "Chain transfer in ethylene polymerization", Journal of Polymer Science: Part A-1, 1966, vol. 4, p. 881-900.
Mortimer, G., "Chain transfer in ethylene polymerization. Additional study at 1360 atm and 130°C", Journal of Polymer Science: Part A-1, Part IV., 1970, vol. 8, p. 1513-1523.
Mortimer, G., "Chain transfer in ethylene polymerization. Part V. The effect of temperature", Journal of Polymer Science: Part A-1, 1970, vol. 8, p. 1535-1542.
Mortimer, G., "Chain transfer in ethylene polymerization VII. Very reactive and depleteable transfer agents", Journal of Polymer Science: Part A-1, 1972, vol. 10, p. 163-168.
Goto et al., "Computer model for commercial high pressure polyethylene reactor based on elementary reaction rates obtained experimentally", Journal of Applied Polymer Science: Applied Polymer Symposium, 1981, 36, 21-40.
International Search Report and Written Opinion pertaining to PCT/US2018/039525, dated Oct. 5, 2018.

* cited by examiner

HIGH PRESSURE, FREE RADICAL POLYMERIZATIONS TO PRODUCE ETHYLENE-BASED POLYMERS

CROSS REFERENCE TO RELATED APPLICATION

The present application is a National Stage Entry under 35 U.S.C. § 371 of International Patent Application No. PCT/US2018/039525, filed Jun. 26, 2018 which claims the benefit of U.S. Provisional Application No. 62/526,003, filed on Jun. 28, 2017.

BACKGROUND OF INVENTION

Low Density Poly Ethylene (LDPE) is produced through a high pressure free radical polymerization process. The polymerization is carried under pressure conditions exceeding a pressure level of 1000 bar. Low density polyethylene (LPDE) polymers can be produced using autoclave(s) and tubular(s) or a combination of autoclave-tube reactors. Among of them, tubular technology is becoming popular, due to high product and process capability as well as scaling-up. Reaction is initiated by radicals achieved from dissociation of peroxides, while modifiers, as known by make-up Chain Transfer Agents (CTAs), are used to control melt index (MI), and thus a part of rheology properties, such as viscosity, melt strength and melt elasticity. "Narrow MWD LDPE" with good optical properties, such as gloss, haze and clarity, are of great importance for film applications. One major concern of tubular LDPE technology is reactor fouling development within the reactor, which decreases heat transfer efficiency between the reactor, preheater and cooling sides (normally boiling water is used as coolant). It is been discovered that, very high level of CTA is preferred to reduce high molecular weight polymer formed at the front of the reactor, thus reducing fouling and improving production rate.

Make-up CTAs can be introduced into the reactor by different technologies. Conventional LDPE tubular process is to inject make-up CTAs to the primary compressor system. However, the injection of make-up CTAs in this position will lead to premature polymerization which generates fouling in the hyper compressor system. It has proposed that fouling in the hyper compressor system can be prevented by injecting CTAs to the suction of the hyper compressor or at the discharge of the second stage of the hyper compressor (see WO2016/022225). However, the premature polymerization in the preheater, in this case, may require a longer preheater length to reach design start/initiation polymerization temperature in the first reaction zone. US2003/01146071 discloses a blend make-up CTA(s) and initiator mixture as a mixture to be injected into the reactor. By this way, fouling in the secondary compressor and preheater can be minimized. However, the blending of make-up CTA and initiator will influence the polarization of solvent used in peroxide, which will significantly decrease initiator/peroxide efficiency. In addition, make-up CTAs can also be injected directly to the reactor, through a high pressure pump, separately from the peroxide system. However, this way can influence the mixing behavior of the additional flow injection over the main flow, which can generate cold spots, thus decreasing heat transfer. There is a need to feed make-up CTAs into the reactor, in such a way to achieve excellent flow mixing and minimal or no premature polymerization in the preheater. This need has been met by the following invention.

SUMMARY OF THE INVENTION

A process to form an ethylene-based polymer in a reactor system, comprising a Hyper-compressor system, and a reactor configuration comprising a tubular reactor, said tubular reactor comprising a preheater, and wherein the tubular reactor is located downstream from the Hyper-compressor system; said process comprising at least the following steps:

a) injecting a first initiator mixture into the tubular reactor at location L along the reactor, b) injecting a compressed make-up CTA system at the location $L_1$, at a distance $(L-L_1)$ from $145*D_{prehehater}$ to $1000*D_{preheater}$, upstream from L, and wherein $D_{preheater}$=the inner diameter of the pre-heater in meter (m); and wherein $L_1$ is located in the preheater, and c) optionally, injecting one or more additional compressed make-up CTA system(s) into the preheater, at one or more location: $L_i$, $L_{i+1}$, $L_n$ ($2 \le i$ and $2 \le n$), upstream from $L_1$, and each location is, independently, at a distance from $145*D_{preheater}$ to $1000*D_{preheater}$, and wherein n equals the total number of injection locations of the make-up CTA system(s) injected into the preheater, upstream from $L_1$, and wherein $(L-L_1)$ is less than each $(L-L_i)$, $(L-L_{i+1})$, $(L-L_n)$; and d) polymerizing a reaction mixture comprising at least ethylene, the first initiator mixture, and the compressed make-up CTA system of step b), in the reactor configuration, to form the ethylene-based polymer; and wherein the process has a log coefficient of variation $(\log(CoV_1))$, at $L_1$, that meets the following relationship:

$$\log CoV_{Li} = \log CoV_{0,Li} - 0.0223 \times \left[\frac{L-Li}{D_{preheater}}\right] \le -1.30,$$

and wherein $$145 \le \frac{(L-L_1)}{D_{preheater}} \le 1000, \text{ and } CoV_{0,L_1} = \left(\frac{\phi_{ethylenemain\ flow,L_1}}{\phi_{make-upCTAsystem\ L_1}}\right)^{0.5},$$

and $\phi_{make-upCTA_{system},L_1}$=the make-up CTA system flow (kg/h) injected into the preheater at location $L_1$, and $$\phi_{ethylenemain\ flow,L_1} = \phi_{ethylenemain\ flow,front\ preheater} + \sum_{i=2}^{i=n} \phi_{make-up\ CTA_{System}Li,upstream from\ L_1};$$

and wherein $\phi_{ethylenemain\ flow,front\ preheater}$=ethylene-based feed flow (kg/h) measured at the injection at "front of the preheater," and $$\sum_{i=2}^{i=n} \phi_{make-up\ CTA_{System}Li,upstream from\ L_1} =$$

the sum of the make-up CTA flow(s) (kg/h) injected into the preheater, upstream from $L_1$; and where for i=n, the "$\phi_{\text{make-up CTA}_{\text{system}}Li,\text{upstream from }L1}$" equals to zero; and wherein, when there are no addition injections of a compressed make-up CTA system into the preheater, then $$\left\{ \sum_{i=2}^{i=n} \phi_{\text{make-up CTA}_{\text{system}}Li,\text{upstream from }L_1} \right\}$$

is zero.

BRIEF DESCRIPTION OF THE DRAWINGS

FIG. 7 demonstrates multiple CTA injection locations in the preheater section. FIG. 1 is a schematic to demonstrate a technology to feed compressed make-up CTA to the preheater, as used for a reactor with ethylene based feed distribution 50/50/0/0 distribution. $CTA_1$ is the make-up CTA system at the shortest distance from the first peroxide injection. $CTA_j$ is the make-up CTA system at the longest distant from the first peroxide injection.

DETAILED DESCRIPTION OF INVENTION

Figure 1A:
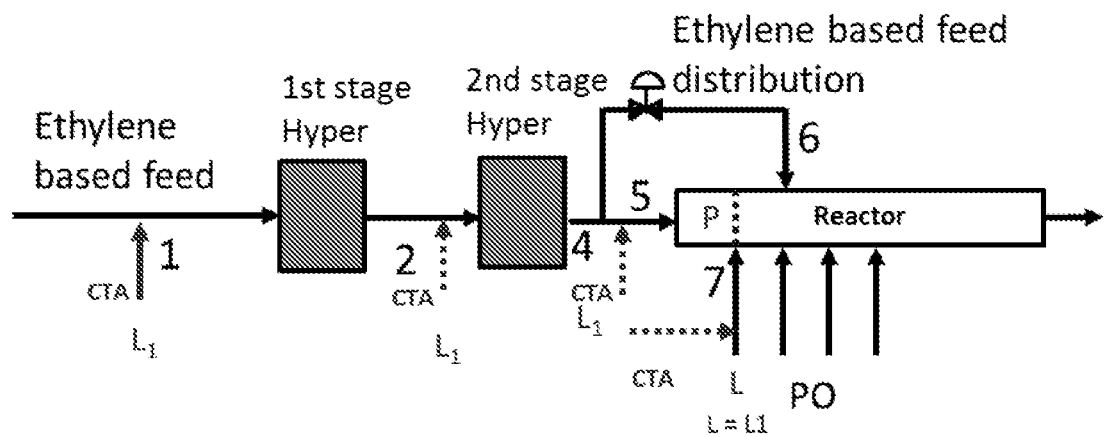
FIG. 1A and FIG. 1B are a process flow diagrams for conventional tubular LDPE process, where there is a make-up CTA system injection for one hyper discharge stream (a) for FIG. 1A, and for two hyper discharge stream (b) for FIG. 1B.

A process to form an ethylene-based polymer, as described above. The process may comprise a combination of two or more embodiments described herein. Here $L1=L_1$, $L2=L_2$, $Li=Li$, $Ln=L_n$, and the like.

In one embodiment, or a combination of embodiments described herein, wherein one or more additional compressed make-up CTA system(s) is/are injected into the preheater, at one or more locations, $L_i$, $L_{i+1}$, $L_{i+2}$, $L_n$ (2≤i, 2≤n), as in step c); and where the process has a log coefficient of variation (CoV), at each position $L_i$, $L_{i+1}$, ..., $L_n$, (2≤i, 2≤n), that meets the following relationship, for each i value from 2 to n:

$$\log CoV_{Li} = \log CoV_{0,Li} - 0.0223 \times \left[\frac{L-Li}{D_{\text{preheater}}}\right] \leq -1.30, \text{ and wherein}$$

$$145 \leq \frac{(L-Li)}{D_{\text{preheater}}} \leq 1000, \text{ and } CoV_{0,Li} = \left(\frac{\phi_{\text{ethylenemain flow,Li}}}{\phi_{\text{make-upCTA}_{\text{system}},Li}}\right)^{0.5}, \text{ and}$$

$$\phi_{\text{ethylenemain flow,Li}} = \phi_{\text{ethylenemain flow,front preheater}} + \sum_{i=2}^{i=n} \phi_{\text{make-up CTA}_{\text{system}}Li+1,\text{upstream from }Li},$$

where $\phi_{\text{ethylenemain flow,front preheater}}$=ethylene-based feed flow (kg/h) measured at the injection at the front of the preheater, and $$\sum_{i=2}^{i=n} \phi_{\text{make-up CTA}_{\text{system}}Li+1,\text{upstream from }Li} =$$

the sum of make-up CTA flow(s) (kg/h) injected into the preheater, upstream from $L_i$; and where for i=n, the "$\phi_{\text{make-up CTAsystem},Li+1\text{ upstream from }Li}$" equals to zero, and wherein, when same make-up CTA system is injected at each location into the preheater, the amount of make-up CTA system injected into the preheater at $L_1$ is at least 51 wt % of the total amount of make-up CTA system injected into the preheater; and wherein, for each make-up CTA system which is different from the make-up CTA system injected at $L_1$, and which is injected into the preheater at a position upstream from $L_1$, then the activity (Cs) of each of these make-up CTA systems is greater than, or equal to, the activity (Cs) of each make-up CTA system injected at a downstream location.

In one embodiment, or a combination of embodiments described herein, the process is a high pressure, free-radical polymerization process. In one embodiment, the ethylene conversion is ≥29%, or ≥30%, or ≥31%, or ≥32%.

In one embodiment, or a combination of embodiments described herein, the mixture further comprises at least one CTA selected from an aldehyde, an alkane, a ketone, an alcohol, an ester, a mercaptan, a phosphine, a phosgene, an alpha-olefin, or a combination thereof. In one embodiment, the mixture further comprises at least one CTA selected from an aldehyde, an alkane, a ketone, an alcohol, an ester, an alpha-olefin, or a combination thereof.

In one embodiment, or a combination of embodiments described herein, the compressed make-up CTA system injected at the location $L_1$ has a CTA activity from 0.0003 to 5.0000, or from 0.0004 to 4.0000, or from 0.0005 to 3.0000. In one embodiment, or a combination of embodiments described herein, the compressed make-up CTA system injected at the location $L_1$ has a CTA activity≤1.000, or ≤0.8000, or ≤0.6000, or ≤0.4000.

In one embodiment, or a combination of embodiments described herein, the $CoVo_{0,L1}$ is from 1 to 180, or from 5 to 175, or from 10 to 170, or from 15 to 165. In one embodiment, or a combination of embodiments described herein, the initial coefficient of variation $CoV_{o,Lj}$ is from 1 to 80, or from 3 to 79, or from 5 to 78 or from 10 to 77.

In one embodiment, or a combination of embodiments described herein, the length of the preheater is from 80 m (meter) to 350 m, or from 90 m to 330 m, or from 100 m to 280 m, or from 110 m to 250 m. In one embodiment, or a combination of embodiments described herein, the preheater has a length from 110 m (meter) to 350 m or from 110 m to 320 m, or from 110 m to 300 m, or from 150 m to 300 m. In one embodiment, or a combination of embodiments described herein, the preheater has an inner diameter from 20 mm to 200 mm, or from 25 mm to 180 mm, or from 30 mm to 160 mm, or from 35 mm to 150 mm, or from 40 mm to 140 mm, or from 45 mm to 130 mm, or from 50 mm to 125 mm. In one embodiment, or a combination of embodiments described herein, the inner diameter of the preheater is from 0.020 m to 0.20 m, or from 0.025 to 0.180, or from 0.030 to 0.160 m, or from 0.035 to 0.150 m, or from 0.040 to 0.140 m, or from 0.045 to 0.130 m, or from 0.050 to 0.125 m.

In one embodiment, or a combination of embodiments described herein, the total ethylene based feed flow discharged from the Hyper-compression system is from 40,000 tons per hour to 300,000 tons per hour, or from 60,000 kg per hour to 300,000 kg per hour, or from 80,000 kg per hour to 300,000 kg per hour, or from 100,000 kg per hour to 300,000 kg per hour. In one embodiment, or a combination of embodiments described herein, the ethylene based feed flow to the hyper compressor system is from 40,000 kg/h to 300,000 kg/h, or from 60,000 kg/h to 280,000 kg/h, or from 60,000 kg/h to 260,000 kg/h, or from 80,000 to 240,000 kg/h.

In one embodiment, or a combination of embodiments described herein, the flow rate of the ethylene based feed flow to the front preheater is from 10,000 kg/hr to 150,000 kg/hr, or from 15,000 kg/hr to 100,000 kg/hr, or from 20,000 kg/hr to 75,000 kg/hr.

In one embodiment, or a combination of embodiments described herein, the density of the ethylene based feed flow is from 300 to 600 kg/m$^3$, or from 350 to 600 kg/m$^3$, or from 350 to 550 kg/m$^3$, or from 400 to 600 kg/m$^3$.

In one embodiment, or a combination of embodiments described herein, the $(L-L_1)/D_{preheater}$ is from 145 to 900, or from 175 to 200, or from 200 to 800, or from 250 to 800, or from 300 to 800, or from 350 to 800. In one embodiment, or a combination of embodiments described herein, $(L-L1)/D_{preheater}$ is from 150 to 800, or from 200 to 800, or from 250 to 800, or from 300 to 800.

In one embodiment, or a combination of embodiments described herein, the $(L-L_i)/D_{preheater}$ is from 145 to 900, or from 175 to 200, or from 200 to 800, or from 250 to 800, or from 300 to 800, or from 350 to 800. In one embodiment, or a combination of embodiments described herein, $(L-Li)/D_{preheater}$ is from 150 to 800, or from 200 to 800, or from 250 to 800, or from 300 to 800. In one embodiment, or a combination of embodiments described herein, the velocity of ethylene based feed flow in the preheater is from 5 to 15 m/s, or from 5 to 14 m/s, or from 5 to 13 m/s or from 5 to 12 m/s.

In one embodiment, or a combination of embodiments described herein, the ethylene-based polymer has a melt index is from 0.20 to 100 g/10 min, of from 0.20 to 80 g/10 min, or from 0.20 to 50 g/10 min, or from 0.20 to 25 g/10 min. In one embodiment, or a combination of embodiments described herein, the ethylene-based polymer has a melt index is from 0.20 to 10 g/10 min, of from 0.5 to 8.0 g/10 min, or from 1.0 to 6.0 g/10 min, or from 2.0 to 4.0 g/10 min.

In one embodiment, or a combination of embodiments described herein, the reactor configuration comprises at least one autoclave reactor downstream from the tubular reactor.

In one embodiment, or a combination of embodiments described herein, the compressed make-up CTA system injected at the location Lj comprises a ketone, an alcohol, an aldehyde, a saturated hydrocarbon, or an unsaturated hydrocarbon. In one embodiment, or a combination of embodiments described herein, make-up CTA can be injected into the preheater at multiple (n) locations, n=1, 2, 3, 4 . . . . In one embodiment, each make-up CTA system injected into the preheater has the same or different CTA activity.

In one embodiment, or a combination of embodiments described herein, one or more make-up CTA system(s) injected into the preheater at location $L_j$, having the same CTA activity of the compressed make/up CTA injected into the preheater at location $L_1$, and wherein the compressed make-up CTA injected into $L_1$ comprises at least 51 wt % of the total make-up CTA injected into the reactor system.

In one embodiment, or a combination of embodiments described herein, for each CTA system, different from the CTA system injected at $L_1$, injected into the preheater at another location, then the activity (Cs) of each of these CTA systems is greater than, or equal to, the activity (Cs) of each CTA system injection at a located downstream position.

In one embodiment, or a combination of embodiments described herein, the highest activity of a make-up CTA system can be from 0.0001 to 5, or from 0.001 to 4.000, or from 0.003 to 3.000.

In one embodiment, or a combination of embodiments described herein, the amount of compressed make-up CTA injected into the preheater at the location $L_1$ is from 51 wt % to 100 wt %, or from 55 wt % to 100 wt %, or from 60 wt % to 100 wt %, or from 65 wt % to 100 wt %, of the total amount of total make-up CTA required to feed into the preheater.

In one embodiment, or a combination of embodiments described herein, the chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol.

Comonomers like vinyl acetate, alkyl acrylates, etc., can also show chain transfer activity. Copolymers made with high levels of these comonomers are typically made with low level, or no, additional CTA. The distribution of fresh ethylene and recycle ethylene containing unconverted comonomer, like vinyl acetate, could have a similar effect on MWD, as described herein.

In one embodiment, or a combination of embodiments described herein, the injection quill of make-up CTAs is installed in the center of the reactor tube and perpendicular to the ethylene base feed flow. In one embodiment, the injection quill is installed is in the center of the tubular reactor, and is aligned perpendicular to the direction of the ethylene base feed flow. In one embodiment, an injection quill is installed in the center of the tubular reactor, and is aligned parallel the direction of the ethylene base feed flow.

In one embodiment, or a combination of embodiments described herein, the hyper compressor system has a design pressure≥2400 bar, or ≥2500 bar, or ≥2600 bar, or ≥2700 bar, or ≥2800 bar, or ≥2900 bar, or ≥3000 bar, or ≥3100 bar, or ≥3200 bar. In one embodiment the hyper compressor system has a design pressure≤4000 bar, or ≤3800 bar, or ≤3600 bar, or ≤3400 bar.

In one embodiment, or a combination of embodiments described herein, the reactor system comprises one or more preheater(s) and/or one or more feed coolers. In one embodiment the reactor configuration comprises at least one tubular reactor. In one embodiment the reactor configuration comprises at least one autoclave reactor. In one embodiment the reactor configuration comprises at least one tubular reactor and at least one autoclave reactor. In one embodiment, the first reaction zone is a tubular reaction zone. In one embodiment, or a combination of embodiments described herein, each reaction zone is a tubular reaction zone.

In one embodiment, or a combination of embodiments described herein, the number of reaction zones in the reactor system is ≥2, or ≥3, or ≥4, or ≥5, or ≥6. In one embodiment, the reactor configuration comprises at least one Primary compressor and at least one Booster compressor. In one embodiment, or a combination of embodiments described herein, the process comprises 2, or 3, or 4, or 5, or 6, or more ethylene based feed streams. In one embodiment, one or more lines feeding an ethylene feed stream to a reaction zone includes a valve to control the distribution of the ethylene feed streams over the reaction zones.

In one embodiment, or a combination of embodiments described herein, each feed to each reaction zone contains the same CTA system. In a further embodiment the CTA system of each feed contains a single CTA. In one embodiment, or a combination of embodiments described herein, at least one of the feeds to at least one of the reaction zones contains a CTA system that is different from at least one of the CTA system(s) to at least one other reaction zone. In one embodiment, or a combination of embodiments described herein, at least one of the feeds to at least one of the reaction zones contains a CTA system that is different from at least one of the CTA systems to the other reaction zones.

In one embodiment, or a combination of embodiments described herein, each CTA is independently selected from an olefin, an aldehyde, a ketone, an alcohol, a saturated hydrocarbon, an ether, a thiol, a phosphine, an acetate, an amino, an amine, an amide, an ester, or an isocyanate.

In one embodiment, or a combination of embodiments described herein, each of the polymerization conditions in the reaction zones, independently, comprises a set temperature less than 400° C., and an inlet pressure less than 1000 MPa, or less than 500 MPa. In one embodiment, or a combination of embodiments described herein, the maximum polymerization temperature in each reaction zone is, independently, from 100 to 400° C.

An inventive process may comprise a combination of two or more embodiments as described herein.

The invention also provides an ethylene-based polymer made by an inventive process. In one embodiment, or a combination of embodiments described herein, the ethylene-based polymer is a polyethylene homopolymer. In one embodiment, or a combination of embodiments described herein, the ethylene-based polymer is an ethylene-based interpolymer comprising at least one comonomer. Ethylene-based polymers include LDPE homopolymer, and high pressure copolymers, including ethylene/vinyl acetate (EVA), ethylene ethyl acrylate (EEA), ethylene butyl acrylate (EBA), ethylene acrylic acid (EAA), ethylene vinyl silane (EVS), ethylene vinyl trimethyl silane (EVTMS), and other copolymers made with "silane-containing" comonomers, copolymers made with dienes (for example, ENB) or polyenes, and ethylene carbon monoxide (ECO). Other comonomers are described in Ehrlich, P.; Mortimer, G. A.; Adv. Polymer Science; Fundamentals of Free-radical Polymerization of Ethylene; Vol. 7, pp. 386-448 (1970). In one embodiment, the ethylene-based polymer is a LDPE.

In one embodiment, or a combination of embodiments described herein, the ethylene-based polymer has a density from 0.910 to 0.940, more typically from 0.912 to 0.940 and even more typically from 0.915 to 0.935 g/cc (g/cm³). In one embodiment, or a combination of embodiments described herein, the ethylene-based polymer has melt index ($I_2$) from 0.1 to 100, more typically from 0.15 to 50, and even more typically from 0.2 to 20, grams per 10 minutes (g/10 min) at 190° C./2.16 kg. In one embodiment, or a combination of embodiments described herein, the ethylene-based polymers of this invention have a typical Mw/Mn from 3 to 20, or from 3.5 to 16, or from 4 to 14. In one embodiment, or a combination of embodiments described herein, the ethylene-based polymers of this invention have a melt strength from 0.5 to 40, or from 1 to 30 centiNewtons (cN). In one embodiment, or a combination of embodiments described herein, the ethylene-based polymers of this invention have two or more of these density, melt index, Mw/Mn and melt strength properties. The ethylene-based polymer, and compositions containing the same, can be used to form articles, such as coatings (for example, extrusion coatings) and films (i.e., single and multi-layered films).

Polymerizations

For a high pressure, free radical initiated polymerization process, two basic types of reactors are known. The first type is an agitated autoclave vessel with one or more reaction zones (autoclave reactor). The second type is a jacketed tube reactor, which tube has one or more reaction zones (the tubular reactor). The high pressure process of the present invention can be carried out in a tubular and/or autoclave reactor, each having at least two reaction zones. In one embodiment, the polymerization is carried out in one or more tubular reactors (in series or in parallel, and preferably in series).

The temperature in each reaction zone of the process is typically from 100 to 400° C., more typically from 120 to 360° C., and even more typically from 140 to 340° C. The pressure at the inlet (pressure can be measured by using a pressure transducer located in the feed line to the inlet) in each reaction zone of the process is typically from 100 to 500 MPa, more typically from 120 to 400 MPa, and even more typically from 150 to 350 MPa. Examples of suitable reactor systems are described in U.S. Publication No. 2003/0114607 and DD276598A3. Commercial, high pressure polymerization processes are typically equipped with recycle systems, in order to maximize the conversion of the incoming ethylene to polymer, and to reduce compression energy. A high pressure recycle typically operates at pressures from 50 to 600 bar, more typically from 120 to 500 bar and even more typically from 200 to 400 bar.

The process of the present invention is a free radical polymerization process. Free radical generating compounds include, but are not limited to, organic peroxides, such as peresters, perketals, peroxy ketones and percarbonates, di-tert-butyl peroxide, cumyl perneodecanoate, and tert-amyl perpivalate. Other suitable initiators include azodicarboxylic esters, azodicarboxylic dinitriles, and 1,1,2,2-tetramethyl-ethane derivatives. These organic peroxy initiators can be used in conventional amounts from 0.005 to 0.2 weight percent, based on the weight of polymerizable monomers. Peroxides are typically injected as diluted solutions in a suitable solvent, for example, in a hydrocarbon solvent. In one embodiment, an initiator is added to at least one reaction zone of the polymerization, and wherein the initiator has a "half-life temperature at one second">255° C., preferably >260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-penta-methyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Chain transfer agents or telogens are used to control the melt index in a polymerization process. Chain transfer involves the termination of growing polymer chains, thus limiting the ultimate molecular weight of the polymer material. A chain transfer agent is typically a component (for example, an organic molecule) able to transfer a hydrogen atom to a growing polymer molecule containing a radical, by which a radical is formed on the chain transfer agent, which can then initiate a new polymer chain. These agents can be of many different types, from saturated hydrocarbons, or unsaturated hydrocarbons, to aldehydes, ketones, or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way. The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic aldehyde alcohols such as methanol, ethanol, propanol or butanol. Comonomers like vinyl acetate, alkyl acrylates, etc., can also show chain transfer activity. Copolymers made with high levels of these comonomers are typically made with low level, or no, additional CTA. The distribution of fresh ethylene and recycle ethylene containing unconverted comonomer, like vinyl acetate, could have a similar effect on MWD.

Definitions

Unless stated to the contrary, implicit from the context, or customary in the art, all parts and percents are based on weight, and all test methods are current as of the filing date of this application. The term "high pressure, free-radical polymerization process," as used herein, refers to a free radical polymerization process carried out at an elevated pressure of at least 1000 bar (100 MPa).

The terms "ethylene conversion," as used herein, refers to weight percentage of the total amount of ethylene fed to the reactor, which is incorporated into the final polymer produced; and {[(weight of polymer produced)/(total weight of ethylene fed to the reactor]×100}=ethylene conversion in wt %]. When propylene is used as a chain transfer agent, the amount of propylene is included in the calculation, such that, {[(weight of polymer produced)/(total weight of ethylene and propylene fed to the reactor]×100}=ethylene conversion in wt %].

The term "reactor system," as used herein, refers to the devices used to polymerize and isolate a polymer. Such devices include, but are not limited to, one or more reactors, reactor pre-heater(s), monomer-reactor cooling device(s), Secondary compressor(s) (or Hyper compressor(s)), Primary compressor(s), and/or Booster compressor(s).

The term "reactor configuration," as used herein, refers to one or more reactors, and optionally one or more reactor pre-heaters, used to polymerize a polymer. Such reactors include, but are not limited to, autoclave reactor(s), tubular reactor(s), and combinations of autoclave and tubular reactors.

The term "inlet pressure of reactor," or "reactor inlet pressure," or similar terms, as used herein, refers to the pressure level at the first inlet of the first reaction zone. The term "inlet pressure of the preheater," or "preheater inlet pressure," or similar terms, as used herein, refers to the pressure level at the front of the preheater.

The term "reaction zone," as used herein, refers to a zone in a reactor where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of make-up and/or recycled ethylene, and/or free radicals or components which dissociate into and/or generate free radicals. The term "first reaction zone," as used herein, refers to the first reactor zone where the polymerization is initiated by the addition of radicals and/or components which dissociate into and/or generate radicals. The first reaction zone ends at the point where there is a new feed of radicals, and/or components which dissociate into and/or generate radicals, and, optionally, make-up and/or recycled ethylene and/or comonomer(s).

The term "preheater (or pre-heater)" refers to the initial portion of a tubular reaction, where the discharged ethylene based feed flow from the Hyper-compressor system is heated to the desired start temperature, normally from 60° C. to 160° C. The phrase "front of the preheater" refers to the first injection point into the pre-heater.

The term "first reaction zone" as used herein, is located downstream from the pre-heater. The first reaction zone starts at the position where the first initiator system is injected, and ends where the next initiator system is injected.

The phrase "maximum temperature for a reaction zone," or "peak temperature," as used herein, refers to the highest temperature measured in a reaction zone, for example, in an autoclave reaction zone (typically, noted as a maximum zone temperature), in a tubular reaction zone (typically noted as a peak temperature).

The terms "feed," or "feed flow," or "feed stream," as used herein, refer to make-up and/or recycled components (for example, ethylene, initiator, CTA, and/or solvent) added to a reaction zone at an inlet.

The terms "ethylene-based feed flow," or "ethylene feed stream" or "ethylene based feed" or "ethylene based feed stream," or "ethylene feed flow," or similar terms as used herein, refer to a feed stream to the reactor system, and which contains a majority amount of ethylene, based on the molar amount of all of the components in the feed stream. Optionally one of more chain transfer agents, comonomers, other process components (for example, lubrication oil, solvent etc.) and/or impurities (for example, initiator degradation products) might be present in the feed stream. The term "total ethylene based feed flow" or "total ethylene flow," or similar terms, as used herein, refers the sum of all ethylene-based feed flows fed to the reactor system.

The term "ethylene-based feed components," or similar terms, as used herein, refer to ethylene (make-up and/or recycled), and optionally CTA (make-up and/or recycled), solvent (make-up and/or recycled), comonomer(s) (make-up and/or recycled) and/or other components (for example, including, but not limited to, make-up and/or recycled lubrication oil(s), antioxidant(s), ethane, methane and/or initiator dissociation products).

The notation "$\phi_{ethylenemain\ flow front\ preheater}$"=ethylene-based feed flow (kg/h) measured at the injection at "front of the preheater," and where the phrase "injection at "front of the preheater," as used herein, refers to the first injection point into the pre-heater.

The notation $$"\sum_{i=2}^{i=n} \phi_{make-up\ CTAsystemLi, upstream from\ L_1}"$$

as used herein, refers to the sum of make-up CTA (pure CTA system, no ethylene) flow(s) injected into the preheater, upstream from $L_1$. The notation $$"\sum_{i=2}^{i=n} \phi_{make-up\ CTAsystemLi+1, upstream\ from\ Li}"$$

as used herein, refers to the sum of make-up CTA (pure CTA system, no ethylene) flow(s) injected into the preheater, upstream from $L_i$.

The term "make-up CTA system," as used herein, refers to the feed stream of CTA needed to compensate for the converted and/or lost CTA in the high pressure polymerization process, and is typically needed to control or to change the product melt index. Here, the "make-up CTA" typically contains a small amount of impurity, such as, for example, ≤3000 ppm water, ≤100 ppm of other impurities, based on the total weight of the make-up CTA system. A make-up CTA system contains ≤1 ppm ethylene, based on total weight of the make-up CTA system, or no ethylene. A make-up CTA system may include a single CTA, or a mixture of two or more CTAs. A CTA system includes a component able to transfer a hydrogen atom to a growing polymer molecule containing a radical, by which a radical is formed on the CTA molecule, which can then initiate a new polymer chain. CTA is also known as telogen or telomere.

The terms "CTA activity" or "chain transfer activity coefficient (Cs or Cs value)" as used herein, refer to the ratio between the "rate of chain transfer" to the "rate of ethylene propagation" for a CTA system at a reference pressure (1360 atm) and a reference temp. (130° C.). See Mortimer references. The "CTA activity of a make-up CTA system is calculated using the molar weighted compositional Cs of the components. For example, a make-up CTA system containing CTA A, CTA B and CTA C, the CTA activity of this system is calculated as follows: CTA A with Cs of 0.3 and mole fraction of 0.2, CTA B with Cs of 0.05 and mole fraction of 0.2, CTA C with Cs of 0.01 and mole fraction of 0.6. The CTA activity of a make-up CTA system, Cs is 0.3*0.2+0.05*0.2+0.01*0.6=0.076. The chain transfer constant (Cs) values for some chain transfer agents are shown below in Table A, showing chain transfer constants (Cs) derived by Mortimer at 130° C. and 200° C., and at 1360 atm, for the shown chain transfer agents.

≥2000 or ≥2200, or ≥2500 Bar and ≤3000 Bar. The term "inner diameter of the preheater Di", as used herein, is defined by the following equation:

$$Di = \sqrt{\frac{4 \times \phi_v}{\pi \times v}},$$

where $\phi_v$ is volumetric ethylene based feed flow fed into the preheater [m³/s] (this flow is the summation of the ethylene main flow and total make-up CTA fed to the preheater), and v is the velocity of the ethylene based feed flow into the preheater [m/s].

The term "initial coefficient of variation at location $L_i$, $CoV_{o,Li}$", as used herein, is defined by the following equation:

$$CoV_{0,Li} = \left(\frac{\phi_{ethylenemain\ flow,\ Li}}{\phi_{make-up\ CTAsystem,\ Li}}\right)^{0.5}, \text{where}$$

$\phi_{ethylenemain\ flow,\ Li} =$ $$\phi_{ethylenemain\ flow,\ Li,\ frontpreheater} + \sum_{i=2}^{i=n} \phi_{make-up\ CTA\ system,\ Li+1,\ upstream\ from\ L_i}$$

and $\phi_{make-up\ CTAsystem,Li}$=make up CTA flow injected into the reactor system at the position $L_i$ [kg/h].

The term "initiator mixture," as used herein, refers to a single initiator, or a mixture of initiators, added to the polymerization process, to initiate the polymerization. In LDPE tubular technology, an initiation mixture may comprise two or more single initiators, with different half-life temperatures at 0.1 hour. Typically, an initiator system comprises a low temperature initiator, a medium temperature initiator and/or a high half-life temperature initiator. Here, the "temperature" refers to the "initiation temperature" at the required half-life time.

The term "first initiator mixture," as used herein, refers to the initiator mixture injected into the reactor system, at the first injection point downstream from the preheater.

The term "composition," as used herein, includes a mixture of materials which comprise the composition, as well as reaction products and decomposition products formed from the materials of the composition.

TABLE A

Cs-Values as Measured by Mortimer at 130° C., or 200° C., and 1360 atm, in References 1-3 and Derived Activation Energies

| | Cs at 130° C., 1360 atm | | Cs at 200° C., 1360 atm | | ΔEa | |
|---|---|---|---|---|---|---|
| Component | value | dev | value | dev | cal/mole | dev |
| Methane | 0 | ±0.0002 | | | | |
| Ethane | 0.0006 | ±0.0005 | | | | |
| Propane | 0.00302 | ±0.0003 | 0.00652 | ±0.00002 | 4200 | ±300 |
| Isobutane | 0.0072 | ±0.0003 | 0.0136 | ±0.0005 | 3500 | ±600 |
| n-Decane | 0.012 | ±0.001 | | | | |
| Propylene | 0.0122 | ±0.0008 | 0.02 | ±0.0006 | 2700 | ±800 |
| Butene-1 | 0.047 | ±0.002 | 0.057 | ±0.004 | 1100 | ±1000 |
| PA | 0.33 | ±0.01 | 0.283 | ±0.004 | −800 | Not defined |

The term "compressed make-up CTA system," as used herein, refers to a CTA system that is subject to a compression force, such that the pressure of the CTA system is ≥ the pressure within the preheater. Typical pressures include The Primary compressor (Primary)" or "Primary compressor system," as used herein, is a device that compresses the following: a) the make-up incoming ethylene, and/or b) the low pressure recycle coming from the Booster, and/or c)

the recycled compressor packing leaks, each to the pressure level required at the inlet side of the Hyper compressor system. This compression can take place in one or multiple compression stages, and can be combined with intermediate cooling. The Primary compressor system can consist of single or multiple compressor frames, and can be potentially combined with Booster compressor frame(s).

The term "Hyper-compressor system" or "Secondary compressor system," as used herein, is a device that compresses a feed stream; for example, at least one of the following: a) the ethylene-based components coming from the HPR (High Pressure Recycle), and/or b) the ethylene-based components, each coming from the Primary compressor system, each to a pressure level required to feed a reactor at its inlet pressure, or to feed a preheater at its inlet pressure. This compression can take place in one or multiple compression stages, and can be combined with intermediate cooling. The Hyper-compressor system typically comprises a reciprocating plunger compressor, and can consist of single or multiple compressor frame(s). The term "Hyper-compressor throughput," as used herein, refers to the net amount of feed components, for example, ethylene-based feed components, compressed and fed to the reactor configuration. The hyper-compressor throughput is a function of the compression volume and the density of the feed components, for example, ethylene based components, at the suction side. The pressure and temperature conditions at the suction side of the secondary compressor will define the density of the feed components, for example, ethylene based components, to be compressed. The term "suction of hyper compressor" refers to a position at the inlet side of the hyper compressor, distributing an ethylene-based flow, with a given composition of ethylene make-up and CTA system, over the inlets a at least to cylinders in the first compression stage. The term "discharge of hyper compressor" refers to a position at the outlet of the hyper compressor, distributing an ethylene-based flow, with a given composition of ethylene make-up and CTA system, over the preheater and reaction zones.

The "Booster compressor (Booster)," or "Booster compressor system," as used herein, is a device that compresses the following: a) the low pressure recycle coming from the LPS (Low pressure Separator), and b) optionally, the recycled compressor packing leaks, each to the pressure level required at the inlet side of the Primary compressor system. This compression can take place in one or multiple compression stages, and can be combined with intermediate cooling. A Booster can consist of single or multiple compressor frames, and can be potentially combined with Primary compressor frame(s).

The term "make-up ethylene," in reference to an ethylene-based feed flow ("make-up ethylene") refers to reactant provided from an external source(s), and not provided internally from a recycled source(s). Make-up ethylene can be used to compensate for the ethylene consumed by the polymerization and/or lost through, for example, ethylene purge from the process and residual ethylene in the polymer.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor. The term "high pressure recycle," as used herein, refers to unreacted reactants such as ethylene, CTA, impurities from the inlet stream, dissociate component initiators, solvents, separated in the gaseous discharge of the high pressure separator(s). Typically a purge flow is taken from HPR to prevent build-up of inert(s) and/or low reactive components in the polymerization process. The term "low pressure recycle," as used herein, refers to unreacted reactants such as ethylene, CTA, impurities from the inlet stream, dissociate component initiators, solvents, separated in the gaseous discharge of the low pressure separator(s).

The term "upstream," as used herein, refers to a location in the reactor system, before a point of reference. For example preheater is located the upstream of the first initiator injection point. Similarly the Hyper-compressor system is located upstream of both the preheater and the first reaction zone. The term "downstream," as used herein, refers to a location in the reactor system, after a point of reference. For example the first reaction zone is located downstream of the pre-heater.

The term "polymer," as used herein, refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. Trace amount of impurities can include initiator residues and other components, like for instance lubrication oil, solvent etc., showing chain transfer activity.

The term "ethylene-based polymer," as used herein, refers to a polymer that comprises 50 wt % or a majority amount of polymerized ethylene, based on the weight of the polymer, and, optionally, at least one comonomer. The term "ethylene-based copolymer" refers to a copolymer that comprises a majority amount of polymerized ethylene, based on the weight of the copolymer, and a comonomer as the only monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Index—Melt index, or $I_2$, was measured in accordance by ASTM D 1238, Condition 190° C./2.16 kg, and was reported in grams eluted per 10 minutes. The I10 was measured in accordance with ASTM D 1238, Condition 190° C./10 kg, and was reported in grams eluted per 10 minutes. Density—Samples for density measurement are prepared according to ASTM D 1928. Samples are pressed at 190° C. and 30,000 psi for three minutes, and then at (21° C.) and 207 MPa for one min. Measurements made within one hour of sample pressing using ASTM D792, Method B.

Experimental

Process Flow Diagram Used for Conventional Make-Up CTA Injection LDPE Tubular Process (FIG. 1a)

The process flow diagram of high pressure polyethylene used for LDPE process with conventional injection of make-up CTA is shown in FIG. 1a. The ethylene based feed flow (line 1) comprises of unreacted ethylene, unreacted CTA which are recycled from the high pressure and low pressure separators; which are located after the reactor section, and are not shown here. The process flow also includes make-up ethylene, make-up CTA, chemical components from peroxide dissociation, solvent and other impurities. It is noted that the ethylene based flow from the low pressure recycle is mixed with make-up ethylene, and the final feed is compressed by a booster and a primary compressor systems. The ethylene based feed flow is compressed in a multistage Hyper compressor system, up to 4000 bar. The discharge flow (line 4) is sent to the front (line 5) and side (line 6) of the reactor. Peroxide/initiator mixture is injected into the reactor at different locations, thus generating multiple reaction zones. In FIG. 1a, the first peroxide is injected downstream from the hyper discharge flow. Make-up CTA is injected at the suction of the first stage of the Hyper compressor system at the location $L_1$ (into line 1). Optionally make-up CTA can be injected into the reactor system at the interstage of the Hyper compressor system (into line 2), or CTA make-up injected at the suction of the hyper compressor system (into line 5, upstream from the preheater). Optionally, make-up CTA can be blended with the first initiator (initiator mixture) and injected into the first reaction zone (into line 7 at the location L). In this scheme, the reactor comprises of four reaction zones, with an ethylene based feed flow distribution to the front and to the side of the reactor, respectively. More number of reaction zones can be achieved by introducing more PO (peroxide) injection nozzles.

Figure 1B:
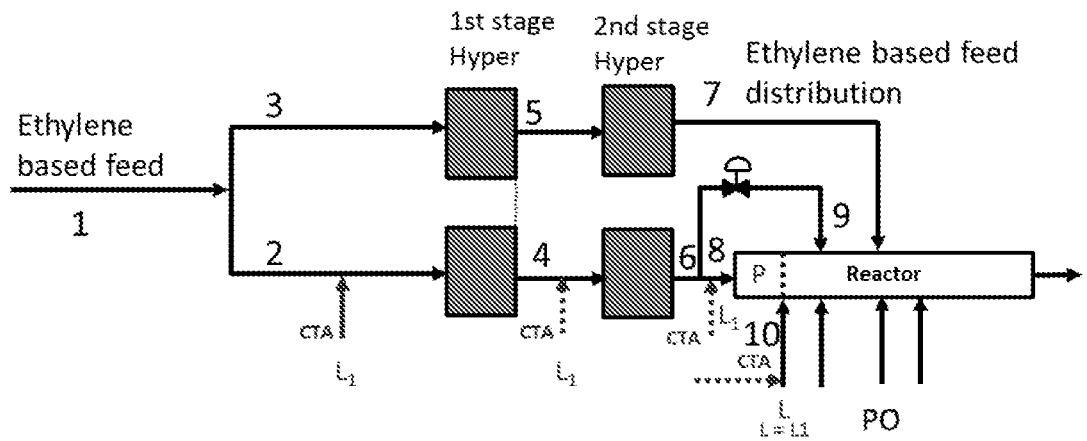

Process Flow Diagram Used for Conventional Make-Up CTA Injection LDPE Tubular Process (FIG. 1b)

The process flow diagram of high pressure polyethylene used for LDPE process with conventional injection of make-up CTA is shown in FIG. 1b. The ethylene based feed flow (line 1) comprises of unreacted ethylene, unreacted CTA which are recycled from the high pressure and low pressure separators. They are located after the reactor section and are not shown here. The ethylene based feed flow (line 1) is then equally divided into stream 2 and stream 3 and fed to the first and subsequently second stages of the multi-stage Hyper compressor system. The discharge flows (line 6 and line 7) are distributed into the reactor. It also includes make-up ethylene, make-up CTA, chemical components from peroxide dissociation, solvent and other impurities. It is noted that the ethylene based flow from low pressure recycle is combined with make-up ethylene and is compressed by booster and primary compressor systems. For instance stream 6 is split into stream 8 and stream 9 through a splitter valve and sent to reaction zones 1 and 2 respectively while stream 7 is fed to the third reaction zone. Initiator mixture is injected into the reactor at different locations thus generating multiple reaction zones. In FIG. 1b, the first peroxide is injected downstream from the hyper discharge flow. Make-up CTA is injected at the suction of the first stage of the hyper compressor system (into line 2) at the location $L_1$. Optionally make-up CTA can be injected into the reactor system at the interstage of the Hyper compressor system (into line 4), or CTA make-up injected at the suction of the hyper compressor system (into line 8, upstream from the preheater). Optionally, make-up CTA can be blended with the first initiator (initiator mixture) and injected into the first reaction zone (into line 10 at the location L). In this scheme, there are four reaction zones with three ethylene based feed flows distributed to the front and side of the reactor. More number of reaction zones can be achieved by introducing more PO injection nozzles.

Figure 2:
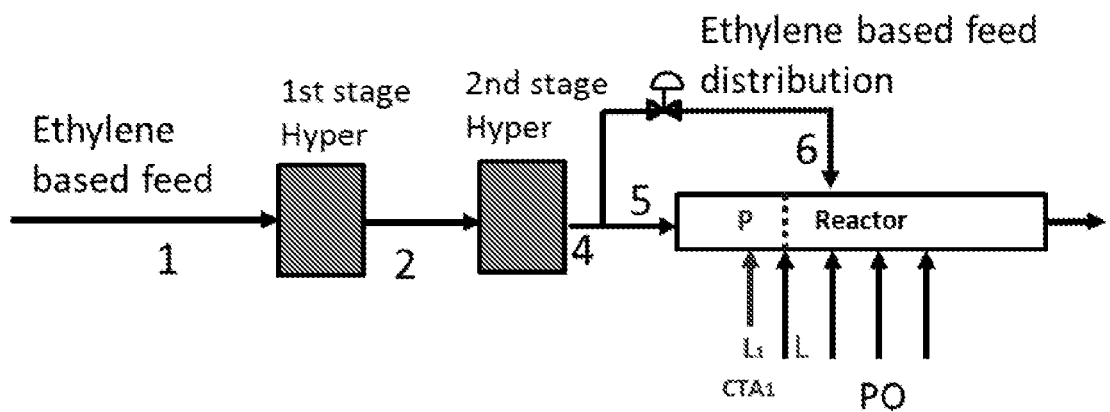
FIG. 2 is a process flow diagram used for examples IP1.1 through IP1.4, IP2.1 through IP2.4, and CP1.1 through IP1.4.

Process Flow Diagram Used for Examples IP1.1 Through IP1.4, IP2.1 Through IP2.4 and IP3.1 Through IP3.4, CP1.1 Through CP1.4 and CP2.1 Through CP2.4 (FIG. 2)

The process flow diagram of high pressure polyethylene used for examples IP1.1 through IP1.4, IP2.1 through IP2.4 and IP3.1 through IP3.4, CP1.1 through CP1.4 and CP2.1 through CP2.4 is shown in FIG. 2. The ethylene based feed flow (line 1) comprises unreacted ethylene, unreacted CTA which are recycled from the high pressure and low pressure separators. The high pressure and low pressure separators are located after the reactor section and are not shown here. It also includes make-up ethylene, chemical components from peroxide dissociation, solvent and other impurities. It is noted that the ethylene based flow from low pressure recycle is mixed with make-up ethylene, and is compressed by booster and primary compressor systems. The ethylene based feed flow is then compressed in a multistage Hyper compressor system up to 4000 bar. The discharge flow (line 4) is sent to the front (line 5) and side (line 6) of the reactor. Initiator mixture is injected into the reactor at different locations, thus generating multiple reaction zones. In FIG. 2, the first peroxide is injected downstream from the hyper discharge flow. Make-up CTA is fed to the preheater as the position $L_1$, upstream from the first peroxide injection location, and downstream from the hyper compressor system. It indicates that all CTA is fed to the first reaction zone. The make-up CTA can be a single CTA, or a mixture of multiple CTA and can be injected into the pre-heater at more than one locations, such as $L_1$ and Li, I=1, 2, 3, etc., In this scheme, the reactor comprises of four reaction zones with an ethylene based feed flow distribution to the front and to the side of the reactor respectively. More number of reaction zones can be achieved by introducing more PO injection nozzles.

Figure 3:
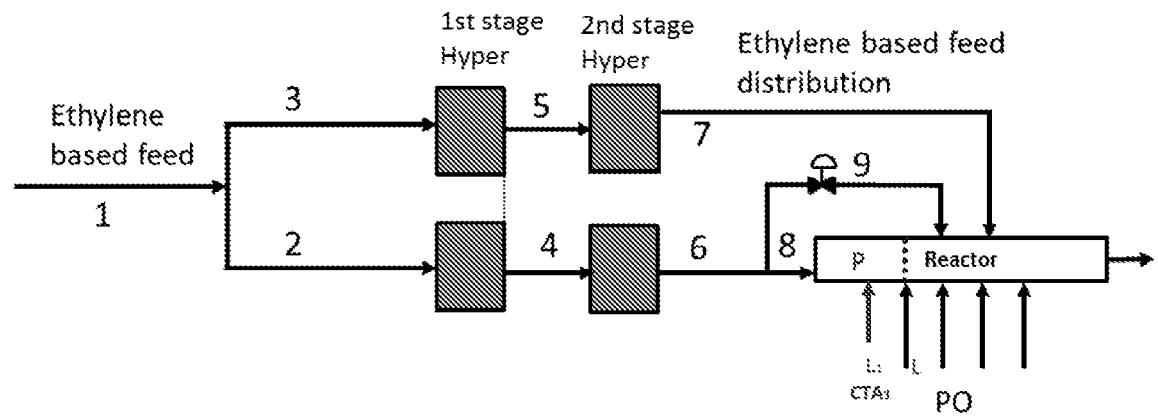
FIG. 3 is a process flow diagram used for examples IP1.5 through IP1.8, IP2.5 through IP2.8, and CP2.4 through CP2.8.

Process Flow Diagram Used for Examples IP1.5 Through IP1.8, IP2.5 Through IP2.8 and IP3.5 Through IP3.8, CP1.5 Through CP1.8 and CP2.5 Through CP2.8 (FIG. 3)

The process flow diagram of high pressure polyethylene used for examples IP1.5 through IP1.8, IP2.5 through IP2.8 and IP3.5 through IP3.8, CP1.5 through CP1.8 and CP2.5 through CP2.8 is shown in FIG. 3. The ethylene based feed flow (line 1) comprises unreacted ethylene, unreacted CTA which are recycled from the high pressure and low pressure separators. They are located after the reactor section and are not shown here. The ethylene based feed flow (line 1) is then equally divided into stream 2 and stream 3 and fed to the first and subsequently second stages of the multi-stage Hyper compressor system. The discharge flows (line 6 and line 7) are distributed into the reactor. It also includes make-up ethylene, make-up CTA, chemical components from peroxide dissociation, solvent and other impurities. It is noted that the ethylene based flow from low pressure recycle is combined with make-up ethylene and is compressed by booster and primary compressor systems. For instance stream 6 is split into stream 8 and stream 9 through a splitter valve and sent to reaction zones 1 and 2 respectively while stream 7 is fed to the third reaction zone. Initiator mixture is injected into the reactor at different locations thus generating multiple reaction zones. In FIG. 3, the first peroxide is injected downstream from the hyper discharge flow. Make-up CTA is fed to the preheater as the position $L_1$ upstream from the first peroxide injection location and downstream from the hyper compressor system. It indicates that all CTA is fed to the first reaction zone. The make-up CTA can be a single CTA, or a mixture of multiple CTA and can be injected into the pre-heater at more than one locations, such as $L_1$ and Li, i=1, 2, 3, etc., In this scheme, there are four reaction zones with three ethylene based feed flows distributed to the front and side of the reactor. More number of reaction zones can be achieved by introducing more PO injection nozzles.

Figure 4:
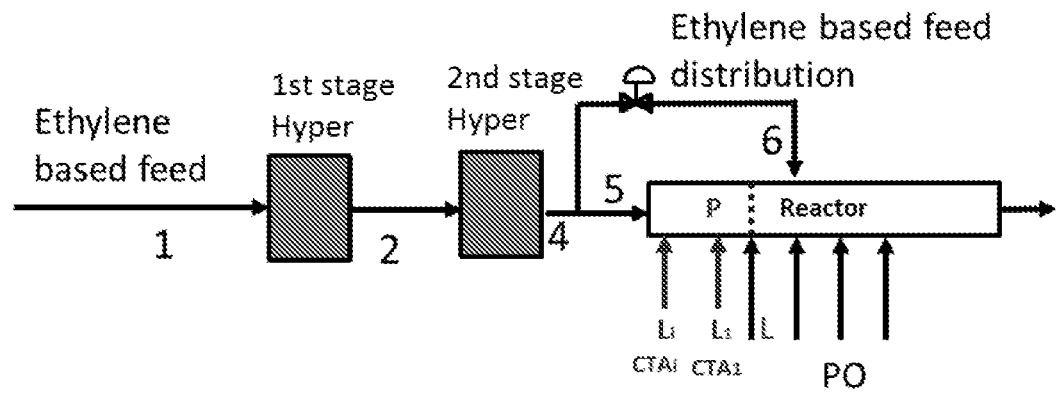
FIG. 4 is a process flow diagram used for examples IP3.1 through IP3.4 and IP4.1 through IP4.4.

Process Flow Diagram Used for Examples IP3.1 Through IP3.4, IP4.1 Through IP4.4 (FIG. 4)

The process flow diagram of high pressure LDPE polyethylene used for examples IP3.1 through IP3.4, IP4.1 through IP4.4 is shown in FIG. 4. It is similar to the process shown in FIG. 2. The only difference is that two CTA systems are injected into the preheater at the locations $L_1$ and $L_2$. More CTA injections locations and CTA systems can also be applied.

Figure 5:
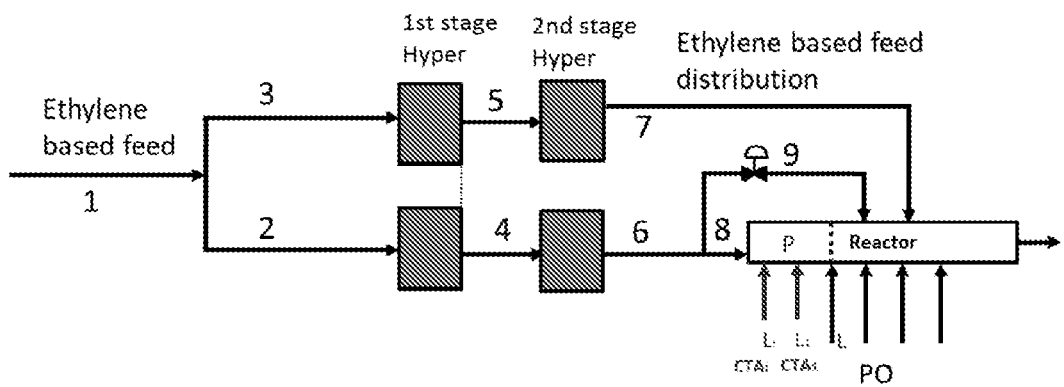
FIG. 5 is a process flow diagram used for examples IP3.5 through IP3.8 and IP4.5 through IP4.8.

Process Flow Diagram Used for Examples IP3.5 Through IP3.8, IP4.5 Through IP4.8 (FIG. 5)

The process flow diagram of high pressure polyethylene used for examples IP3.5 through IP3.8, IP4.5 through IP4.8 is shown in FIG. 5. It is similar to the process shown in FIG. 2. The only difference is that two CTA systems are injected into the preheater at the locations $L_1$ and $L_2$. More CTA injections locations and CTA systems can also be applied.

TABLE 1

Kinetic Constants for Selected CTAs

| Component | Chain Transfer to Modifier | | | Reactivity Ratios | |
|---|---|---|---|---|---|
| | ko [m³/(hr*kmol)] | Ea cal/mol | ΔV cc/mol | $r_1$ $(k_{11}/k_{12})$ | $r_2$ $(k_{22}/k_{21})$ |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will typically lower the density of the polymer by 0.001 to 0.004 g/cc. Furthermore the comonomer activity will increase the overall consumption level per reactor pass, by which more propylene has to be added to compensate for the consumption as CTA as well as comonomer.

REFERENCES

General: G. Luff, *Chem.-Ing.-Tech., Hochdruck-Polyaethylen*, Vol. 51 (1979) Nr. 10, pages 960-969. Peroxide efficiency: T. van der Molen et al., *Ing. Chim. Ital*, "Light-off" temperature and consumption of 16 initiators in LDPE production, Vol. 18, N 1-2, February 1982, pages 7-15. Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). See LDPE simulation model in S. Goto et al., *Journal of Applied Polymer Science: Applied Polymer Symposium*, 36, 21-40, 1981 (Title: *Computer model for commercial high pressure polyethylene reactor based on elementary reaction rates obtained experimentally*).

Example of Calculation for Inventive IP4.1

It is assumed that: (i) make-up $CTA_1$ system at $L_1$ (Cs=0.0072) has flow rate of 60 wt % of the total make-up CTA system flow, thus the remaining make-up CTA system (40 wt % of the total make-up CTA system flow) is contributed by the make-up CTA system at $L_2$ (Cs=0.33). Assume that total make-up CTA system(s) flow rate has the same activity of make-up $CTA_{system,L2}$ (Cs=0.33). Cs ratio between make-up $CTA_{system,L2}$ and make-up $CTA_{system,L1}$:

$$R_{Cs} = \frac{C_s, CTA_{system,L2}}{C_s, CTA_{system,L1}} = \frac{0.33}{0.0072} = 45.83.$$

Make-up $CTA_{system,L1}$ (Cs = 0.0072):

$\phi_{CTA_{system,L1}} =$ $\phi_{total\,make-up,\,CTAsystem} \times 60\,\text{wt}\,\% \times R_{Cs} = 50 \times 60\,\text{wt}\,\% \times 45.83 =$ 1375(kg/h) Make-up $CTA_{system,L2}$ (at Cs = 0.33):

$\phi_{CTA_{system,L2}} = \phi_{total\,make-up,\,CTAsystem} \times (1 - 60\,\text{wt}\,\%) =$ $50 \times (1 - 0.6) = 20\,(\text{kg/h})$ Ethylene main flow at $L_1$ position:

$\phi_{ethylene,mainflow,L1} =$ $\phi_{ethylene,preheater} + \phi_{CTA_{system,L2}} = 20{,}000 + 20 = 20{,}020\,(\text{kg/h}).$ Ethylene main flow at L2 position:

$\phi_{ethylene,mainflow,L1} = \phi_{ethylene,preheater} = 20{,}000\,(\text{kg/h}),$ Calculation of $CoV_{0,L1}$ and $CoV_{0,L2}$:

$$CoV_{o,L1} = \sqrt{\frac{\phi_{ethylene,mainflow,L1}}{\phi_{CTA_{system,L1}}}} = \sqrt{\frac{20{,}020\,(\text{kg/h})}{1375\,(\text{kg/h})}} = 3.8,$$

$$CoV_{o,L2} = \sqrt{\frac{\phi_{ethylene,mainflow,L2}}{\phi_{CTA_{system,L2}}}} = \sqrt{\frac{20000\,(\text{kg/h})}{20\,(\text{kg/h})}} = 31.6.$$

Calculation of $CoV$ at $L_1 = 145 * D_{preheater}$ and at $L2 = 250 * D_{preheater}.$ $logCoV_{L1} = \log(CoVo)_{L1} - 0.0023 * (L - L_1)/D_{preheater} =$ $\log(3.8) - 0.023 * 145 = -2.65\,(<-1.30),$ $logCoV_{L2} = \log(CoVo)_{L2} - 0.0023 * (L - L_2)/D_{preheater} =$ $\log(31.6) - 0.023 * 250 = -4.07\,(<-1.30).$ Tables 2 represents the ethylene based feed flow and make-up CTA system for comparative examples CP1.1 through CP2.8. Ethylene based feed flow is distributed over the reactor by 50/50/0/0 and 25/25/50/0 (four reaction zones). The plant scale (hyper throughput) is varied from 40,000 kg/h to 300,000 kg/h. The calculated polymers have melt index from 0.2 to 20 g/10 min. Note that an increase of throughput will result in increase of make-up CTA system flow for the same melt index product (see total make-up CTA flow injected into the reactor system in Table 2). In this example, the propionaldehyde is used as a main CTA, which has the activity of 0.33 and 20% conversion. Make-up CTA system is injected into the preheater at the location $L_1$, upstream from the first initiator (initiator mixture) injection (location L), or at the dimensionless distance $(L-L_1)/D_{preheater}=100$ (CP1.1 through CP1.8), or $(L-L_1)/D_{preheater}=1500$ (CP2.1 through CP2.8).

Table 3 shows process input flows (ethylene based flow and make-up CTA system) for inventive examples IP1.1 through IP2.8. In those examples, make-up CTA system is injected into the preheater section at the location $L_1$, upstream from the first initiator injection (location L), and where the ($L-L_1$) meets the following relationship as shown in Equation (1): $145 \leq (L-L_1)/D_{preheater} \leq 1000$ (Eqn. 1). Table 4 is used for inventive examples IP3.1 through IP4.8. In those examples, two make-up CTA systems have been injected into the preheater at the locations $L_1$ and $L_2$, each upstream from the first initiator injection (location L), and where the ($L-L_1$) and ($L-L_2$) meets the following relationship as shown in Equation (2): $145 \leq (L-L_2)/D_{preheater} \leq (L-L_1)/D_{preheater} \leq 1000$ (Eqn. 2).

The inventive examples IP3.1 through IP3.8 show two make-up CTA system injections at the locations $L_1$ and $L_2$, and here the same make-up CTA system (Cs=0.33) was used. Note that for those cases, the make-up CTA system at location $L_1$ should consists of at least 51 wt % of the total make-up CTA system(s) required by the reactor system to produce a certain melt index product. The inventive examples IP4.1 through 4.8 demonstrated two different make-up CTA systems injected into the preheater, with different CTA activities, such as n-butane (Cs=0.0072, 1% conversion) and propionaldehyde (Cs=0.33, 20% conversion). Importantly, the make-up CTA system with the lowest activity is recommended to be injected into the preheater at the location $L_1$, while the make-up CTA system with the higher CTA activity is recommended to be injected into the preheater at the location $L_2$, to achieve a high degree of mixing, in a shortest distance (from L position) as possible. Similarly, more make-up CTA system can be injected into the preheater at location Li (i=3, 4, 5, n, etc.), and each Li position must satisfy Equation (3): $145 \leq (L-L_n)/D_{preheater} \leq (L-L_i)/D_{preheater} \leq (L-L_1)/D_{preheater} \leq 1000$, ($2 \leq i \leq n$) (Eqn. 3).

Furthermore, for each make-up CTA system, which is different from the make-up CTA system injected at $L_1$, and which is injected into the preheater at a position upstream from $L_1$, then the activity (Cs) of each of these make-up CTA systems is greater than, or equal to, the activity (Cs) of each make-up CTA system injected at a downstream location.

Mixing Quality in Turbulent Flow

Mixing quality of at least an additional flow (can be a small flow rate) into a main flow (high flow rate) is evaluated by coefficient of variation (CoV), which is a function of initial coefficient of variation (CoVo), and the dimensionless distance (L−Li) and tube diameter $D_i$, as follows: (L−Li)/$D_i$ ratio. In LDPE tubular technology, the initial coefficient of variation is defined by below Equation 5:

$$CoV_{o,L1} = \left( \frac{\phi_{ethylene\ main\ stream,Li}}{\phi_{make-up\ CTA\ system\ i,Li}} \right)^{0.5} \quad \text{(Eqn. 5)}$$

wherein "ϕ ethylene main stream, Li:" is the ethylene based feed flow [kg/h] at the position Li, excluding the make-up CTA system injected at the Li position.

$\phi_{make-up\ CTA\ system\ i,Li}$: Make up CTA system flow injected into the preheater at the position $L_i$ [kg/h]. For industrial application, CoV is determined by Equation 6:

$$logCoV_{Li} = logCoV_{0,Li} - \log K \times \frac{L-L_i}{D_{preheater}} \leq -1.30, \quad \text{(Eqn. 6)}$$

note that ($L-L_i$) is a distance between the first peroxide injection (L) and the make-up CTA system injection at position $L_i$. Make-up CTA system is injected upstream from the first peroxide injection point (L). Di is the inner diameter of the preheater where the main flow and make-up CTA system flow are injected. The K value is a mixing parameter. For a turbulent flow, the mixing parameter K=0.95. The lower CoV, the better mixture quality of the flow stream through the preheater. For "$0.01 \leq CoV \leq 0.05$" a good mixing of the flow stream results for commercial polymerizations. This indicate 95% of all concentration measurements, from the tube cross section of the preheater, vary by less than 2%. Thus K=0.95 is used for commercial polymerizations. With K=0.95, Equation 6 becomes Equation 7:

$$logCoV_{Li} = logCoV_{0Li} - 0.0223 \frac{L-L_i}{D_{preheater}} \leq -1.30. \quad \text{(Eqn. 7)}$$

Comparative CP1.1 Through CP2.8 (FIGS. 1A and 1B)

Typical tubular LDPE technologies have applied conventional make-up CTA system injection in which the make-up CTA system can be injected into the primary compressor system and/or into the suction of the hyper compressor system, and/or into the interstage of the hyper compressor system, and/or at the discharge of the hyper compressor system. Those technologies result in excellent flow mixing prior to reacting with free radicals dissociated from the first initiator mixture. However, make-up CTA can also generate free radicals, which result in premature of polymerization into the hyper compressor system, resulting in more fouling in the compressor system, and requiring more maintenance work. Moreover, polymers can also be formed inside the preheater, which result in increased fouling thus decreasing heat transfer effect. Since the ethylene based feed flow need to be heated to a desired start reaction temperature, it will require more heating energy or a longer preheater length, indicating a more expensive process. If make-up CTA system is blended with the first initiator (initiator mixture), prior to injecting into the reaction zone, it will result in poor flow mixing, creating cold spots with increasing fouling in the reaction zones. Also, the blending CTA and initiator can also significantly decrease the initiator efficiency.

In the comparative CP1.1 through CP1.8, a compressed make-up CTA system is injected into the preheater at the location $L_1$ from the first initiator location (first reaction zone at location L), indicating dimensionless distance $(L-L_1)/D_{preheater}=100$. Note that the make-up CTA system is compressed to a pressure which is at least equal to the pressure of the preheater, prior to being injected into the preheater. As can be shown in Table 6, the mixing quality, as presented by $\log(CoV_{L1})$, is greater than −1.30, resulting in an imperfect mixing flow at the first initiator location L. The imperfect mixing flow results in cold spots, thus generating high fouling in the reaction zones. In the CP2.1 through CP2.8 comparatives, compressed make-up CTA system is injected into the preheater at the location $(L-L_1)/D_{preheater}=1500$. This results in $\log(CoV_{L1}) \ll -1.30$, indicating perfect mixing flow behavior. However, since the compressed make-up CTA system is injected at a distance $L_1$, which is very far away from the L position. Thus, more premature polymer is made, resulting in higher fouling in the preheater.

Inventive IP1.1 Through IP2.8 (One Make-Up CTA System Injected into the Preheater)

Inventive examples IP1.1 through IP2.8 show one compressed make-up CTA system injected into the preheater at the location $L_1$. The ratio "$(L-L_1)/D_{preheater}$" is between 145 and 1000, indicating perfect mixing flow with low fouling in the preheater. The imperfect mixing flow will happen when $(L-L_1)/D_{preheater}<145$, and high fouling in the preheater when $(L-L_1)/D_{preheater}>1000$. See Table 6 for detail calculations.

Inventive IP3.1 Through IP3.8 (Two Make-Up CTA Systems Injected into the Preheater)

In the inventive examples IP3.1 through 3.8, two compressed make-up CTA systems, each having the same Cs value, are injected into the preheater at the location $L_2$ and $L_1$, in which $L_2$ is upstream from the $L_1$ location. Note that the $L_1$ and $L_2$ locations satisfied the following relationship: $145<(L-L_1)/D_{preheater}<(L-L_2)/D_{preheater}<1000$. In those examples, compressed make-up CTA system injected into the preheater at $L_1$ and $L_2$ locations has the same activity (Cs=0.33). In order to reach perfect mixing flow, at the minimum distance prior to the first initiator mixture injection, it is recommended that the compressed make-up CTA system at the location $L_1$ should be at least 51 wt % of the total required amount of the make-up CTA system for producing a certain melt index product. By minimizing the $(L-L_1)$ distance, fouling generated into the preheater can also be minimized.

Inventive IP4.1 Through IP4.8 (Two Make-Up CTA Systems Injected into the Preheater)

Figure 6:
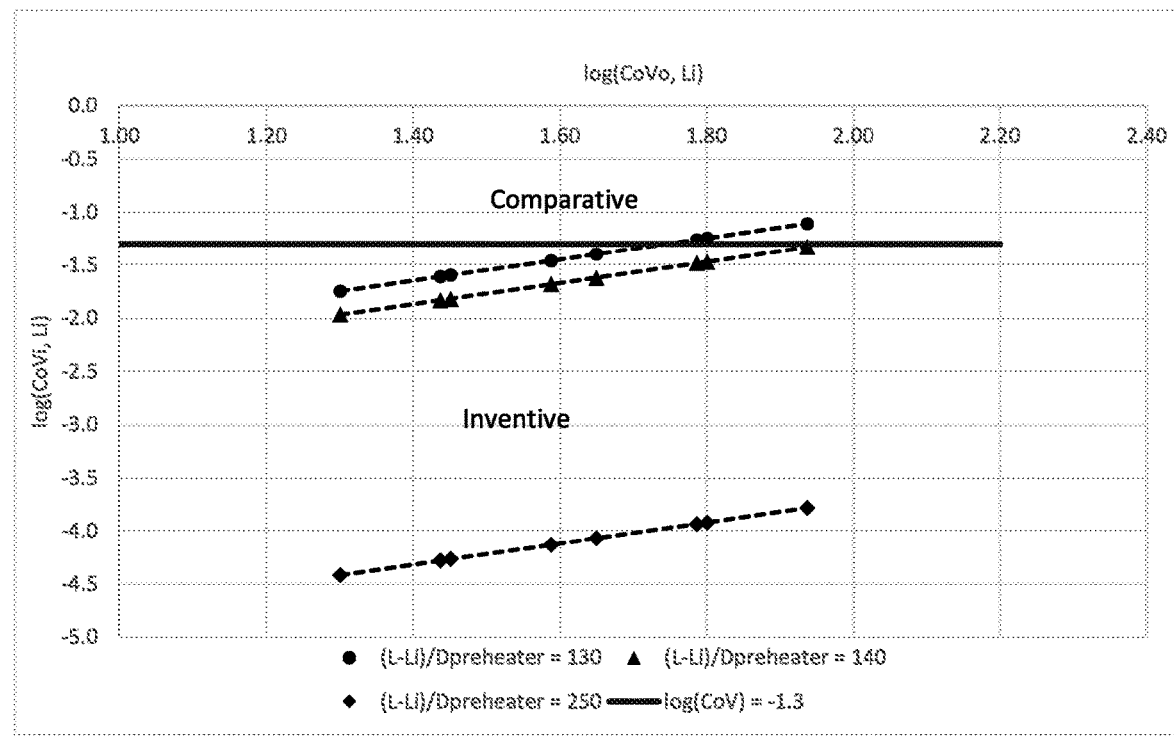
FIG. 6 is profiles of log(CoV) as a function of log (CoVo) at different $(L-L_i)/D_{\text{preheater}}$ values.
Figure 7:
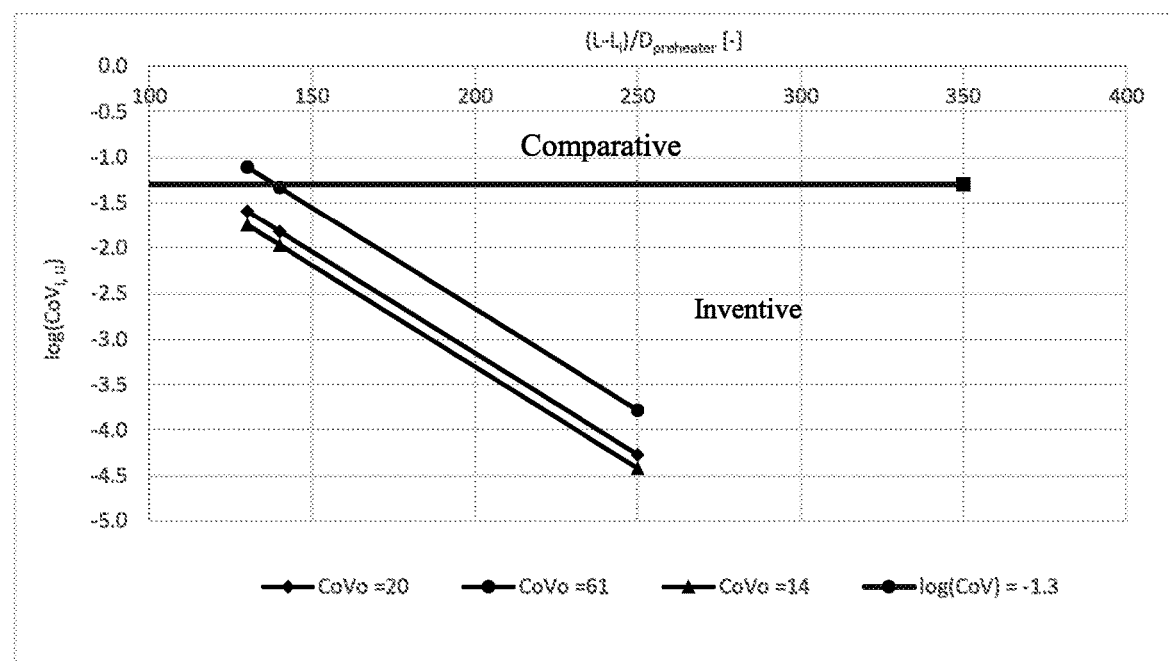
FIG. 7 is a profile of log(CoV) as a function of $(L-L_i)/D_{\text{preheater}}$ at different log(CoVo) values.
Figure 8:
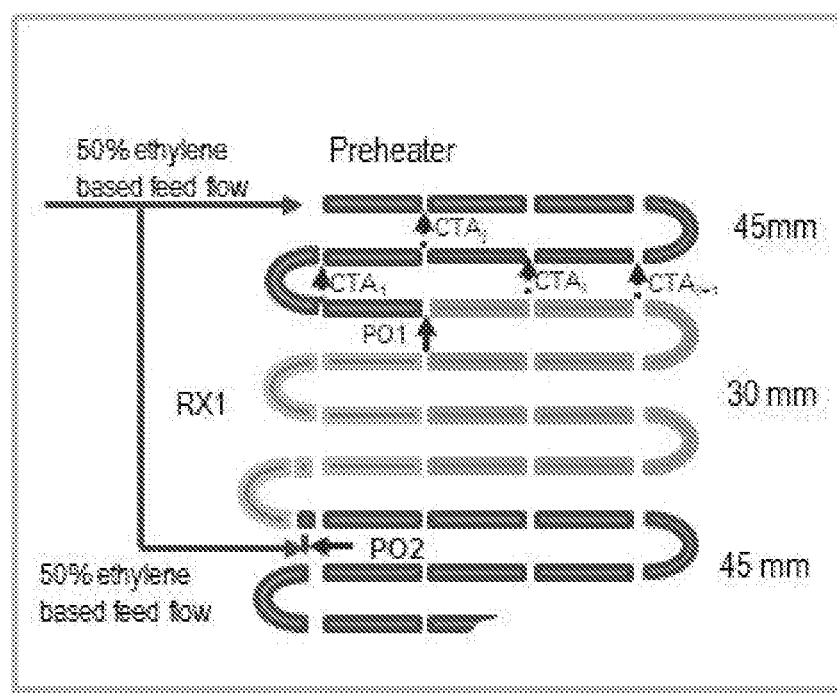
FIG. 8 is a demonstration of compressed make-up CTA system injection to the preheater.

The inventive examples IP4.1 through IP4.8 use two compressed make-up CTA systems injected into the preheater, at the location $L_2$ and $L_1$ location, where $L_2$ is upstream from L1. In those examples, the compressed make-up CTA systems, injected into the preheater at $L_1$ and $L_2$ locations, have different CTA activities. It was discovered that the compressed make-up CTA system at the location $L_1$ should have a lower CTA activity, while the compressed make-up CTA system with the highest CTA activity should be injected at a location $L_n$ ($2 \le i \le n$), in order to reach the perfect flow mixing quality at a shorter $(L-Li)$ distance as possible. The higher Cs value will require a lower CTA flow (for the same melt index product), resulting in a higher $CoV_0$ value. The higher $CoV_0$ value will give an increase in the log(CoV) value, thus resulting in less perfect mixing performance, or it will require a much longer distance from L, thus generating more fouling in the preheater. The distance between the make-up CTA injection, and the first initiator mixture injection are calculated with assumed ethylene based feed flow velocity in the preheater is around 10 m/s. Detail calculations can be found in Table 6 and Table 7. The influence of $\log(CoV_0)$ and $(L-L_i)/D_{preheater}$ on log(CoV) is shown in FIG. 6 and FIG. 7. Furthermore, a demonstration of compressed make-up CTA system injection to the preheater can be found in FIG. 8.

The injection of a compressed make-up CTA system into the preheater at a certain location from the first peroxide injection, to improve flow mixing performance and heat transfer in the preheater and reaction zones has been discovered. It has been discovered that by injecting the compressed make-up CTA system at the position $L_i$, in which the distance $145<(L-L_i)/D_{preheater}<1000$ is met, results in excellent mixing behavior and low fouling in the preheater and the reactor ($\log(CoV_{Li})<-1.30$). If multiple, different make-up CTA systems are applied, a compressed CTA system with the lowest Cs value is recommended to be injected at the $L_1$ position, while the CTA system with the highest Cs value should be injected into the preheater at the longest distance from the first initiator mixture injection. On the other hand, if the same make-up CTA system is injected into the multiple locations, the compressed make-up CTA system flow at the location $L_1$ should be at least 51 wt % of the total make-up CTA system flow required by the reactor system for controlling product properties.

TABLE 2

Ethylene-based feed flow and make flow distribution into the preheater and first reaction zone for comparative examples. Make-up CTA system has a Cs value of 0.33. CTA injected at the location $L_1$ where $(L-L_1)/D_{preheater}$ = 100 (CP1.1 through CP1.8) or $(L-L_1)/D_{preheater}$ = 1500 (CP2.1 through CP2.8).

| Ex. | Ethylene based feed distribution | Hyper throughput main flow(*) (discharge flow) kg/h | Ethylene main flow measured at (at location $L_1$) kg/h | Ethylene main flow measured at the front of the preheater() kg/h | Ethylene based feed flow into the preheater (*) kg/h | Total make-up CTA system injected into preheater (Cs = 0.33) kg/h | Make-up CTA system injected at location $L_1$ (Cs = 0.33) kg/h | $CoV_{0, L1}$ (*) [—] | MI g/10 min |
|---|---|---|---|---|---|---|---|---|---|
| CP1.1 | 50/50/0/0 | 40000 | 20000 | 20000 | 20050 | 50 | 50 | 20 | 20 |
| CP1.2 | 50/50/0/0 | 40000 | 20000 | 20000 | 20010 | 10 | 10 | 45 | 0.20 |
| CP1.3 | 50/50/0/0 | 300000 | 150000 | 150000 | 150200 | 200 | 200 | 27 | 20 |
| CP1.4 | 50/50/0/0 | 300000 | 150000 | 150000 | 150040 | 40 | 40 | 61 | 0.20 |
| CP1.5 | 25/25/50/0 | 40000 | 10000 | 10000 | 10050 | 50 | 50 | 14 | 20 |
| CP1.6 | 25/25/50/0 | 40000 | 10000 | 10000 | 10010 | 10 | 10 | 32 | 0.20 |
| CP1.7 | 25/25/50/0 | 300000 | 75000 | 75000 | 75200 | 200 | 200 | 19 | 20 |
| CP1.8 | 25/25/50/0 | 300000 | 75000 | 75000 | 75040 | 40 | 40 | 43 | 0.20 |
| CP2.1 | 50/50/0/0 | 40000 | 20000 | 20000 | 20050 | 50 | 50 | 20 | 20 |
| CP2.2 | 50/50/0/0 | 40000 | 20000 | 20000 | 20010 | 10 | 10 | 45 | 0.20 |
| CP2.3 | 50/50/0/0 | 300000 | 150000 | 150000 | 150200 | 200 | 200 | 27 | 20 |
| CP2.4 | 50/50/0/0 | 300000 | 150000 | 150000 | 150040 | 40 | 40 | 61 | 0.20 |
| CP2.5 | 25/25/50/0 | 40000 | 10000 | 10000 | 10050 | 50 | 50 | 14 | 20 |

TABLE 2-continued

Ethylene-based feed flow and make flow distribution into the preheater and first reaction zone for comparative examples. Make-up CTA system has a Cs value of 0.33. CTA injected at the location $L_1$ where $(L-L_1)/D_{preheater} = 100$ (CP1.1 through CP1.8) or $(L-L_1)/D_{preheater} = 1500$ (CP2.1 through CP2.8).

| Ex. | Ethylene based feed distribution | Hyper throughput (discharge flow) kg/h | Ethylene main flow(*) (at location $L_1$) kg/h | Ethylene main flow measured at the front of the preheater() kg/h | Ethylene based feed flow into the preheater(*) kg/h | Total make-up CTAsystem injected into preheater (Cs = 0.33) kg/h | Make-up CTAsystem injected at location $L_1$ (Cs = 0.33) kg/h | $CoV_{0,L1}$ (*) [—] | MI g/10 min |
|---|---|---|---|---|---|---|---|---|---|
| CP2.6 | 25/25/50/0 | 40000 | 10000 | 10000 | 10010 | 10 | 10 | 32 | 0.20 |
| CP2.7 | 25/25/50/0 | 300000 | 75000 | 75000 | 75200 | 200 | 200 | 19 | 20 |
| CP2.8 | 25/25/50/0 | 300000 | 75000 | 75000 | 75040 | 40 | 40 | 43 | 0.20 |

(*)Ethylene main flow is the ethylene based feed flow, including make-up ethylene and recycle flow, but excluding make-up CTA flow at the position Li. See FIG. 2 and FIG. 3.
(**)Ethylene main flow measured at the front of the preheater which excludes total make-up CTA flow.
(***)Ethylene based feed flow into the preheater which is equal to the ethylene main flow measured at the front of the preheater plus total CTA make-up flow injected into the preheater.

TABLE 3

Ethylene-based feed flow and make flow distribution to the preheater and first reaction zone for inventive examples claim 1. Make-up CTA system has a Cs value of 0.33. CTA injected at the location $L_1$ where $(L-L_1)/D_{preheater} = 145$ (IP1.1 through IP1.8) or $(L-L_1)/D_{preheater} = 1000$ (IP2.1 through IP2.8). Only one CTA injection into the preheater.

| Example | Ethylene based feed distribution | Hyper throughput kg/h | Ethylene main flow(*) (at the location $L_1$) kg/h | Ethylene main flow measured at the front of the preheater() kg/h | Ethylene based feed flow into the preheater(*) kg/h | Total make-up CTAsystem injected into preheater (Cs = 0.33) kg/h | Make-up CTAsystem injected at location $L_1$**** (Cs = 0.33) kg/h | $CoV_{0,L1}^{(a)}$ [-] | MI g/10 min |
|---|---|---|---|---|---|---|---|---|---|
| IP1.1 | 50/50/0/0 | 40000 | 20000 | 20000 | 20050 | 50 | 50 | 20 | 20 |
| IP1.2 | 50/50/0/0 | 40000 | 20000 | 20000 | 20010 | 10 | 10 | 45 | 0.20 |
| IP1.3 | 50/50/0/0 | 300000 | 150000 | 150000 | 150200 | 200 | 200 | 27 | 20 |
| IP1.4 | 50/50/0/0 | 300000 | 150000 | 150000 | 150040 | 40 | 40 | 61 | 0.20 |
| IP1.5 | 25/25/50/0 | 40000 | 10000 | 10000 | 10050 | 50 | 50 | 14 | 20 |
| IP1.6 | 25/25/50/0 | 40000 | 10000 | 10000 | 10010 | 10 | 10 | 32 | 0.20 |
| IP1.7 | 25/25/50/0 | 300000 | 75000 | 75000 | 75200 | 200 | 200 | 19 | 20 |
| IP1.8 | 25/25/50/0 | 300000 | 75000 | 75000 | 75040 | 40 | 40 | 43 | 0.20 |
| IP2.1 | 50/50/0/0 | 40000 | 20000 | 20000 | 20050 | 50 | 50 | 20 | 20 |
| IP2.2 | 50/50/0/0 | 40000 | 20000 | 20000 | 20010 | 10 | 10 | 45 | 0.20 |
| IP2.3 | 50/50/0/0 | 300000 | 150000 | 150000 | 150200 | 200 | 200 | 27 | 20 |
| IP2.4 | 50/50/0/0 | 300000 | 150000 | 150000 | 150040 | 40 | 40 | 61 | 0.20 |
| IP2.5 | 25/25/50/0 | 40000 | 10000 | 10000 | 10050 | 50 | 50 | 14 | 20 |
| IP2.6 | 25/25/50/0 | 40000 | 10000 | 10000 | 10010 | 10 | 10 | 32 | 0.20 |
| IP2.7 | 25/25/50/0 | 300000 | 75000 | 75000 | 75200 | 200 | 200 | 19 | 20 |
| IP2.8 | 25/25/50/0 | 300000 | 75000 | 75000 | 75040 | 40 | 40 | 43 | 0.20 |

(*)Ethylene main flow is the ethylene flow fed to the preheater at $L_1$ ($\phi_{ethylene\ main\ flow,\ L_1}$). This flow is excluding make-up CTA system flow. See FIGS. 2 and 3.
Note that
$\left\{\sum_{i=2}^{i=n} \phi \text{ make-up } CTA_{system}\ Li,\ \text{upstream from } L_1\right\}$ is zero.

(**)Ethylene main flow measured at the front of the preheater ($\phi_{ethylene\ main\ flow,\ front\ preheater}$). In this case it is the discharge flow after the split using a splitter valve resulting in 50/50 or 25/25/50 ethylene based feed flow distribution. Measured value.
(***)The $\phi_v$, which is calculated, for example CP1.1, as follows: ethylene main flow fed into the preheater = ethylene main flow measured at the front of the preheater + make-up CTA system flow at L1 = 20,000 kg/h + 50 kg/h = 2050 kg/h. This flow is used to calculate the inner diameter of the preheater, or if the inner diameter is fixed, it will be used to calculate the ethylene based feed flow velocity in the preheater.
(****)The $\phi$ make-up CTAsystem, $L_1$, a measured value.

$^{(a)}CoV_{0,L_1} = \left(\dfrac{\phi \text{ ethylene main flow, } L_1}{\phi \text{ make-up } CTA_{system},\ L_1}\right)^{0.5}$.

The "inner diameter of preheater Di is as follows: $Di = \sqrt{\dfrac{4 \times \phi_v}{\pi \times v}}$, where $\phi_v$ is ethylene based feed flow fed into the preheater [m³/s];

$\phi_v = \phi$ ethylene main flow, front preheater + total make-up CTA system fed to the preheater, here $\phi_v = \{[(20000\ kg/h + 50\ kg/h)/$ $3600\ h/s]/450\ kg/m^3\} = 0.0123\ m^3/s$; and $v$ is the velocity (m/s) of ethylene based feed flow into the preheater [m/s].

Here $v = \{[(20000\ kg/h + 50\ kg/h)/(450\ kg/m^3)](360\ s/h)\}/(\text{cross-sectional inner area of pre-heater}) = \{[(44.5\ m^3/h)/3600\ s/h]/$ $(0.00123\ m^2)\} = 10\ m/s$. Here the density of ethylene = 450 kg/m³(temp. of pre-heater = 140° C. and pressure (inside) of preheater =

TABLE 3-continued

Ethylene-based feed flow and make flow distribution to the preheater and first reaction zone for inventive examples claim 1. Make-up CTA system has a Cs value of 0.33. CTA injected at the location $L_1$ where $(L-L_1)/D_{preheater} = 145$ (IP1.1 through IP1.8) or $(L-L_1)/D_{preheater} = 1000$ (IP2.1 through IP2.8). Only one CTA injection into the preheater.

| Example | Ethylene based feed distribution | Hyper throughput kg/h | Ethylene main flow(*) (at the location $L_1$) kg/h | Ethylene main flow measured at the front of the preheater() kg/h | Ethylene based feed flow into the preheater(*) kg/h | Total make-up CTAsystem injected into preheater (Cs = 0.33) kg/h | Make-up CTAsystem injected at location $L_1$**** (Cs = 0.33) kg/h | $CoV_{0,L1}{}^{(a)}$ [-] | MI g/10 min |
|---|---|---|---|---|---|---|---|---|---|

2600 Bar). Here, $Di = 39.6$ mm. $\phi$ ethylene main flow, $L_1$ = $\phi$ ethylene main flow, front preheater + $\sum_{i=2}^{i=n} \phi$ make-up $CTA_{system}i$, upstream from $L_1$; and where $\phi$ ethylene main flow, front preheater = ethylene-based feed flow (kg/h) measured at the injection at "front of the preheater" (first injection point into the pre-heater), and $\sum_{i=2}^{i=n} \phi$ make-up $CTA_{system}i$, upstream from $L_1$ = the sum of make-up CTA system flow(s) injected into the pre-heater, upstream from $L_1$ (if there is more than one injection point into the preheater).

$$\log CoV_1 = \log CoV_{0,L1} - 0.0223 \times \left[\frac{L-L_1}{D_{preheater}}\right] \leq -1.30, \text{ and wherein}$$

$$145 \leq \frac{(L-L_1)}{D_{preheater}} \leq 1000, \text{ and } CoV_{0,L1} = \left(\frac{\phi_{ethylene\ main\ flow,L_1}}{\phi_{make-up\ CTA_{system},L_1}}\right)^{0.5}.$$

TABLE 4

Ethylene main flow and CTA make-up flow for inventive IP3.1 through IP4.8 with two CTA systems injected into two locations of the preheater - different Cs values. Two CTA systems injections into the preheater. $(L-L_1)/D_{preheater} = 145$ and $(L-L_2)/D_{preheater} = 250$ (IP3.1 through IP3.8, same CTA activity (Cs) values (for $L_1$ and $L_2$ locations), and IP4.1 to IP 4.8, different CTA activity (Cs) values (for $L_1$ and $L_2$ locations))

| Ex. | Ethylene based feed distribution | Chain transfer activity, Cs1/Cs2 | Hyper throughput (total ethylene based feed flow) kg/h | Ethylene based flow measured at the font of the preheater kg/h | Ethylene main flow at $L_1$ position$^{(a)}$ kg/h | Ethylene main flow at $L_2$ position$^{(b)}$ kg/h | Ethylene based feed flow including make-up CTA system injection flow into the preheater$^{(c)}$ kg/h | Total CTA system injected into the preheater (required based on high CTA activity) (Cs = 0.33)(*) kg/h | Make-up CTA system flow of $CTA_{L1}$ (Cs1) kg/h | Make-up CTA system flow of $CTA_{L2}$ (Cs2) kg/h | $CoV_{0,L1}{}^{(d)}$ | $CoV_{0,L2}{}^{(e)}$ | MI g/10 min |
|---|---|---|---|---|---|---|---|---|---|---|---|---|---|
| IP3.1 | 50/50/0/0 | 0.33/0.33 | 40000 | 20000 | 20020 | 20000 | 20050 | 50 | 30 | 20 | 25.8 | 31.6 | 20 |
| IP3.2 | 50/50/0/0 | 0.33/0.33 | 40000 | 20000 | 20004 | 20000 | 20010 | 10 | 6 | 4 | 57.7 | 70.7 | 0.2 |
| IP3.3 | 50/50/0/0 | 0.33/0.33 | 300000 | 150000 | 150080 | 150000 | 150200 | 200 | 120 | 80 | 35.4 | 43.3 | 20 |
| IP3.4 | 50/50/0/0 | 0.33/0.33 | 300000 | 150000 | 150016 | 150000 | 150040 | 40 | 24 | 16 | 79.1 | 96.8 | 0.2 |
| IP3.5 | 25/25/50/0 | 0.33/0.33 | 40000 | 10000 | 10020 | 10000 | 10050 | 50 | 30 | 20 | 18.3 | 22.4 | 20 |
| IP3.6 | 25/25/50/0 | 0.33/0.33 | 40000 | 10000 | 10004 | 10000 | 10010 | 10 | 6 | 4 | 40.8 | 50.0 | 0.2 |
| IP3.7 | 25/25/50/0 | 0.33/0.33 | 300000 | 75000 | 75080 | 75000 | 75200 | 200 | 120 | 80 | 25.0 | 30.6 | 20 |
| IP3.8 | 25/25/50/0 | 0.33/0.33 | 300000 | 75000 | 75016 | 75000 | 75040 | 40 | 24 | 16 | 55.9 | 68.5 | 0.2 |
| IP4.1 | 50/50/0/0 | 0.0072/0.33 | 40000 | 20000 | 20020 | 20000 | 21340 | 50 | 1320 | 20 | 3.9 | 31.6 | 20 |
| IP4.2 | 50/50/0/0 | 0.0072/0.33 | 40000 | 20000 | 20004 | 20000 | 20268 | 10 | 264 | 4 | 8.7 | 70.7 | 0.2 |
| IP4.3 | 50/50/0/0 | 0.0072/0.33 | 300000 | 150000 | 150080 | 150000 | 155360 | 200 | 5280 | 80 | 5.3 | 43.3 | 20 |
| IP4.4 | 50/50/0/0 | 0.0072/0.33 | 300000 | 150000 | 150016 | 150000 | 151072 | 40 | 1056 | 16 | 11.9 | 96.8 | 0.2 |
| IP4.5 | 25/25/50/0 | 0.0072/0.33 | 40000 | 10000 | 10020 | 10000 | 11340 | 50 | 1320 | 20 | 2.8 | 22.4 | 20 |
| IP4.6 | 25/25/50/0 | 0.0072/0.33 | 40000 | 10000 | 10004 | 10000 | 10268 | 10 | 264 | 4 | 6.2 | 50.0 | 0.2 |
| IP4.7 | 25/25/50/0 | 0.0072/0.33 | 300000 | 75000 | 75080 | 75000 | 80360 | 200 | 5280 | 80 | 3.8 | 30.6 | 20 |
| IP4.8 | 25/25/50/0 | 0.0072/0.33 | 300000 | 75000 | 75016 | 75000 | 76072 | 40 | 1056 | 16 | 8.4 | 68.5 | 0.2 |

(*) total required make-up CTA system flow to control melt index, based on make-up CTA system having the highest CTA activity, Cs = 0.33. Assumed that the amount of make-up CTA system injected into the $L_1$ position is 60 wt % of the total of make-up CTA system flow required to control melt index.
→ make-up CTA system at $L_1$ = 50 (kg/h) * 60 (wt %) = 30 kg/h, make-up CTA system at $L_2$ = 50 (kg/h) − 30 kg/h = 20 kg/h.
Example calculation for IP3.1
$^{(a)}$Ethylene main flow at $L_1$ position = (Hyper compressor discharge) * split factor + make-up CTA system at $L_2$ position = (40,000 kg/h * 0.5 + 20 kg/h) = 20,020 (kg/h).
$^{(b)}$Ethylene main flow at $L_2$ position = (Hyper compressor discharge) * split factor = 40,000 * 0.5 = 20,000 kg/h.
$^{(c)}$Ethylene based feed flow including total make-up CTA system injection flow in the preheater = ethylene based flow measured at the front of the preheater + make-up CTA system at $L_1$ + make-up CTA system at $L_2$ location = 20000 kg/h + 30 kg/h + 20 kg/h = 20050 kg/h. This flow is used to design inner diameter of the preheater or to calculate the velocity of the preheater.
$^{(d)}CoV_0, L_1$ = ethylene main flow at $L_1$ position/make-up CTA system at $L_1$ = $(20020/30)^{0.5}$ = 25.8.
$^{(e)}CoV_0, L_2$ = ethylene main flow at $L_2$ position/make-up CTA system at $L_2$ = $(20,000/20)^{0.5}$ = 31.6.

TABLE 5

Preheater diameter and (L − L1) distance for comparative examples. Ethylene based flow velocity (v) in the preheater is 10 m/s.
One make-up CTA system injected into preheater.

| Example | pre-heater diameter Dpreheater at v (preheater) = 10 m/s Dpreheater [m](*) | $(L - L_1)$ at $(L - L_1)/$ Dpreheater = 100 $L - L_1 = D_{preheater} \times 100$ [m] | $(L - L_1)$ at $(L - L_1)/$ Dpreheater = 1500 $L - L_1 = D_{preheater} \times 1500$ [m] | $CoVo, L_1$ $(L - L_1)/$ $D_{preheater} = 100$ | $CoVo, L_1$ $(L - L_1)/$ $D_{preheater} = 1500$ | $\log(CoV_{L1}) = \log C_0V_{0,L1} - 0.0223 \times (L-L_1)/D_{preheater}$ (Log $CoV_{L1}$) at $(L-L_1)/$ Dpreheater = 100 | $\log(CoV_{L1}) = \log C_0V_{0,L1} - 0.0223 \times (L-L_1)/D_{preheater}$ (Log $CoV_{L1}$) at $(L-L_1)/$ Dpreheater = 1500 | Reactor performance Mixing quality | Fouling in Preheater |
|---|---|---|---|---|---|---|---|---|---|
| CP1.1 | 0.040 | 4.0 | NA | 20 | NA | −0.93 | NA | Poor | Low |
| CP1.2 | 0.040 | 4.0 | | 45 | | −0.58 | | Poor | Low |
| CP1.3 | 0.109 | 10.9 | | 27 | | −0.79 | | Poor | Low |
| CP1.4 | 0.109 | 10.9 | | 61 | | −0.44 | | Poor | Low |
| CP1.5 | 0.028 | 2.8 | | 14 | | −1.08 | | Poor | Low |
| CP1.6 | 0.028 | 2.8 | | 32 | | −0.73 | | Poor | Low |
| CP1.7 | 0.077 | 7.7 | | 19 | | −0.59 | | Poor | Low |
| CP1.8 | 0.077 | 4.0 | | 43 | | −0.93 | | Poor | Low |
| CP2.1 | 0.040 | NA | 59.5 | NA | 20 | NA | −32.11 | Good | High |
| CP2.2 | 0.040 | | 59.5 | | 45 | | −31.76 | Good | High |
| CP2.3 | 0.109 | | 163.0 | | 27 | | −31.98 | Good | High |
| CP2.4 | 0.109 | | 162.9 | | 61 | | −31.63 | Good | High |
| CP2.5 | 0.028 | | 42.2 | | 14 | | −32.26 | Good | High |
| CP2.6 | 0.028 | | 42.1 | | 32 | | −31.91 | Good | High |
| CP2.7 | 0.077 | | 115.3 | | 19 | | −32.13 | Good | High |
| CP2.8 | 0.077 | | 115.2 | | 19 | | −31.78 | Good | High |

(*)Inner diameter of preheater is calculated as follows:

$$DPreheater = \sqrt{\frac{4 * \phi_{ethylene\ based\ feed\ to\ preheater}}{4 * v}};$$

$\phi_{ethylene\ based\ feed\ to\ preheater}$ = ethylene-based feed flow to the preheater (included everything).

TABLE 6

Flow velocity in preheater and CTA injection location (upward from the first peroxide injection)
for inventive examples. Ethylene based flow velocity (v) in the preheater is 10 m/s.
One make-up CTA system injected into preheater.

| Ex. | pre-heater diameter Dpreheater at v (p-heater) = 10 m/s Di [m] | $(L-L_1)$ at $(L-L_1)/$ Dpreheater = 145 $L-L_1 = D_{preheater} \times 145$ [m] | $(L-L_1)$ at $(L-L_1)/$ Dpreheater = 1000 $L = D_{preheater} \times 1000$ [m] | $CoV_{0, L1}$ [—] | $\log(CoV_{L1}) = \log C_0V_{0,L1} - 0.0223 \times (L-L_1)/D_{preheater}$ (Log $CoV_{L1}$) at $(L-L_1)/$ Dpreheater = 145 | $\log(CoV_{L1}) = \log C_0V_{0,L1} - 0.0223 \times (L-L_1)/D_{preheater}$ (Log $CoV_{L1}$) at $(L-L_1)/$ Dpreheater = 1000 | Reactor performance Mixing quality | Fouling in Preheater |
|---|---|---|---|---|---|---|---|---|
| IP1.1 | 0.040 | 5.2 | | 20 | −1.93 | | Good | Low |
| IP1.2 | 0.040 | 5.2 | | 45 | −1.58 | | Good | Low |
| IP1.3 | 0.109 | 14.1 | | 27 | −1.79 | | Good | Low |
| IP1.4 | 0.109 | 14.1 | | 61 | −1.44 | | Good | Low |
| IP1.5 | 0.028 | 3.6 | | 14 | −2.08 | | Good | Low |
| IP1.6 | 0.028 | 3.6 | | 32 | −1.73 | | Good | Low |
| IP1.7 | 0.077 | 10.0 | | 19 | −1.94 | | Good | Low |
| IP1.8 | 0.077 | 10.0 | | 43 | −1.59 | | Good | Low |
| IP2.1 | 0.040 | NA | 5.6 | 20 | NA | −4.27 | Good | Low |
| IP2.2 | 0.040 | | 5.6 | 45 | | −3.92 | Good | Low |
| IP2.3 | 0.109 | | 15.2 | 27 | | −4.13 | Good | Low |
| IP2.4 | 0.109 | | 15.2 | 61 | | −3.78 | Good | Low |
| IP2.5 | 0.028 | | 3.9 | 14 | | −4.42 | Good | Low |
| IP2.6 | 0.028 | | 3.9 | 32 | | −4.07 | Good | Low |
| IP2.7 | 0.077 | | 10.7 | 19 | | −4.28 | Good | Low |
| IP2.8 | 0.077 | | 10.7 | 43 | | −3.93 | Good | Low |

TABLE 7

Flow velocity in preheater and CTA injection location (upward from the first peroxide injection) for inventive examples.
Ethylene based flow velocity (v) in the preheater is 10 m/s. (L-L$_1$) < (L-L$_2$). Two make-up CTA systems
were injected into the preheater. IP3.1 through IP3.8 examples use the same Cs value at L1 and L2
locations. IP4.1 through IP4.8 examples use different Cs values at L1 and L2 locations

| | pre-heater diameter $D_{preheater}$ at v | (L-L$_1$) at (L-L$_1$)/ $D_{preheater}$ = 145 | (L-L$_2$) at (L-L$_2$)/ $D_{preheater}$ = 250 | | | log(CoV$_{Li}$) = log C$_0$V$_{0, Li}$ − 0.0223 × (L-L$_i$)/D$_{preheater}$ | | | |
|---|---|---|---|---|---|---|---|---|---|
| | | L-L$_1$ | L-L$_1$ | | | (Log CoV)$_{L1}$ | (Log CoV)$_{L2}$ | Reactor performance | |
| Ex. | (p-heater) = 10 m/s Di [m] | $D_{preheater}$ × 145 [m] | $D_{preheater}$ × 250 [m] | CoV$_{0, L1}$ | CoV$_{0, L2}$ | at (L-L$_1$)/ $D_{preheater}$ = 145 | at (L-L$_2$)/ $D_{preheater}$ = 250 | Mixing quality | Fouling in Preheater |
| IP3.1 | 0.040 | 5.9 | 10.1 | 25.8 | 31.6 | −1.82 | −4.07 | Good | Low |
| IP3.2 | 0.040 | 5.8 | 10.0 | 57.7 | 70.7 | −1.47 | −3.72 | Good | Low |
| IP3.3 | 0.109 | 15.9 | 27.5 | 35.4 | 43.3 | −1.68 | −3.93 | Good | Low |
| IP3.4 | 0.109 | 15.8 | 27.2 | 79.1 | 96.8 | −1.33 | −3.58 | Good | Low |
| IP3.5 | 0.028 | 4.2 | 7.3 | 18.3 | 22.4 | −1.97 | −4.22 | Good | Low |
| IP3.6 | 0.028 | 4.1 | 7.1 | 40.8 | 50.0 | −1.62 | −3.87 | Good | Low |
| IP3.7 | 0.077 | 11.4 | 19.7 | 25.0 | 30.6 | −1.83 | −4.08 | Good | Low |
| IP3.8 | 0.077 | 11.2 | 19.3 | 55.9 | 68.5 | −1.48 | −3.73 | Good | Low |
| IP4.1 | 0.040 | 5.9 | 10.2 | 3.9 | 31.6 | −2.65 | −4.07 | Good | Low |
| IP4.2 | 0.040 | 5.8 | 10.0 | 8.7 | 70.7 | −2.30 | −3.72 | Good | Low |
| IP4.3 | 0.109 | 16.0 | 27.6 | 5.3 | 43.3 | −2.51 | −3.93 | Good | Low |
| IP4.4 | 0.109 | 15.8 | 27.2 | 11.9 | 96.8 | −2.16 | −3.58 | Good | Low |
| IP4.5 | 0.028 | 4.3 | 7.5 | 2.8 | 22.4 | −2.80 | −4.22 | Good | Low |
| IP4.6 | 0.028 | 4.1 | 7.1 | 6.2 | 50.0 | −2.45 | −3.87 | Good | Low |
| IP4.7 | 0.077 | 11.5 | 19.9 | 3.8 | 30.6 | −2.66 | −4.08 | Good | Low |
| IP4.8 | 0.077 | 11.2 | 19.3 | 8.4 | 68.5 | −2.31 | −3.73 | Good | Low |

The invention claimed is:

1. A process to form an ethylene-based polymer in a reactor system, comprising a Hyper-compressor system, and a reactor configuration comprising a tubular reactor, said tubular reactor comprising a preheater, and wherein the tubular reactor is located downstream from the Hyper-compressor system; said process comprising at least the following steps:

a) injecting a first initiator mixture into the tubular reactor at location L along the reactor, b) injecting a compressed make-up CTA system at the location Li, at a distance (L-Li) from $145*D_{preheater}$ to $1000*D_{preheater}$, upstream from L, and wherein $D_{preheater}$=an inner diameter of the preheater in meter (m); and wherein $L_1$ is located in the preheater, and c) optionally, injecting one or more additional compressed make-up CTA system(s) into the preheater, at one or more location: $L_i, L_{i+1}, \ldots, L_n$ (2≤i and 2≤n), upstream from Li, and each location is, independently, at a distance from $145*D_{preheater}$ to $1000*D_{preheater}$, and wherein n equals the total number of injection locations of the make-up CTA system(s) injected into the preheater, upstream from $L_1$, and wherein (L-L$_1$) is less than each (L-L$_i$), (L-L$_{i+1}$, ..., (L-L$_n$); and d) polymerizing a reaction mixture comprising at least ethylene, the first initiator mixture, and the compressed make-up CTA system of step b), in the reactor configuration, to form the ethylene-based polymer; and wherein the process has a log coefficient of variation (log(CoV$_1$)), at $L_1$, that meets the following relationship:

$$logCoV_1 = logCoV_{0,L1} - 0.0223 \times \left[\frac{L - L_1}{D_{preheater}}\right] \leq -1.30,$$

and wherein $$145 \leq \frac{(L - L_1)}{D_{preheater}} \leq 1000, \text{ and } CoV_{0,L1} = \left(\frac{\phi_{ethylene\ main\ flow, L_1}}{\phi_{make-up\ CTA\ system\ L_1}}\right)^{0.5},$$

and $\phi_{make-upCTA_{system},L_1}$=the make-up CTA system flow (kg/h) injected into the preheater at location $L_1$, and $$\phi_{ethylene\ main\ flow, L_1} = \phi_{ethylene\ main\ flow, front\ preheater} + \sum_{i=2}^{i=n} \phi_{make-up\ CTA_{system}Li,\ upstream\ from\ L_1};$$

and wherein $\phi_{ethylene\ mainflow, front\ preheater}$=ethylene-based feed flow (kg/h) measured at the injection at "front of the preheater," and $$\sum_{i=2}^{i=n} \phi_{make-up\ CTA_{system}Li,\ upstream\ from\ L_1} =$$

the sum of the make-up CTA flow(s) (kg/h) injected into the preheater, upstream from $L_1$; and wherein for i=n, the "$\phi_{make-upCTA_{system},Li,\ upstream\ from\ L_1}$" equals to zero; and wherein, when there are no additional injections of a compressed make-up CTA system into the preheater, then $$\left\{\sum_{i=2}^{i=n} \phi_{make-up\ CTA_{system}Li,\ upstream\ from\ L_1}\right\}$$

is zero.

2. The process of claim 1, wherein one or more additional compressed make-up CTA system(s) is injected into the preheater, at one or more locations, $L_i$, $L_{i+1}$, $L_{i+2}$., $L_n$ (2≤i, 2≤n), as in step c); and wherein the process has a log coefficient of variation (CoV), at each position $L_i$, $L_{i+1}$, $L_n$, (2≤i, 2≤n), that meets the following relationship, for each i value from 2 to n:

$$logCoV_{Li} = logCoV_{0,Li} - 0.0223 \times \left[\frac{L-Li}{D_{preheater}}\right] \leq -1.30,$$

and wherein $$145 \leq \frac{(L-Li)}{D_{preheater}} \leq 1000, \text{ and}$$

$$CoV_{0,Li} = \left(\frac{\phi_{ethylene\ main\ flow,\ Li}}{\phi_{make-up\ CTA_{system},L_i}}\right)^{0.5}, \text{ and}$$

$\phi_{ethylene\ main\ flow,\ Li} =$ $$\phi_{ethylene\ main\ flow,\ front\ preheater} + \sum_{i=2}^{i=n} \phi_{make-up\ CTA_{system}Li+1,upstream\ from\ Li},$$

where $\phi_{ethylene\ mainflow,front\ preheater}$=ethylene-based feed flow (kg/h) measured at the injection at the front of the preheater, and $$\sum_{i=2}^{i=n} \phi_{make-up\ CTA_{system}Li+1,upstream\ from\ Li} = \text{the sum of}$$

make-up CTA system flow(s) (kg/h) injected into the preheater, upstream from $L_i$; and where for i=n, "$\phi_{make-upCTA_{system},Li,\ upstream\ from\ L1}$" equals to zero, and wherein, when same make-up CTA system is injected at each location into the preheater, the amount of make-up CTA system injected into the preheater at $L_1$ is at least 51 wt % of the total amount of make-up CTA system injected into the preheater; and wherein, for each make-up CTA system which is different from the make-up CTA system injected at $L_1$, and which is injected into the preheater at a position upstream from $L_1$, the activity (Cs) of each of these make-up CTA systems is greater than, or equal to, the activity (Cs) of each make-up CTA system injected at a downstream location.

3. The process of claim 1, wherein the process is a high pressure, free-radical polymerization process.

4. The process of claim 1, wherein the compressed make-up CTA system, injected at the location Li, has a CTA activity≤1.0000.

5. The process of claim 1, wherein $CoV_{0,L1}$ is from 1 to 180.

6. The process claim 1, where the total ethylene based feed flow discharged from the Hyper-compression system is from 40,000 kg per hour to 300,000 kg per hour.

7. The process of claim 1, where $(L-L_1)/D_{preheater}$ is from 145 to 900.

8. The process of claim 1, wherein the reactor configuration comprises at least one autoclave reactor downstream from the tubular reactor.

9. The process of claim 1, wherein a compressed make-up CTA system is injected at the location Li, and wherein this make-up CTA system comprises a ketone, an alcohol, an aldehyde, a saturated hydrocarbon, or an unsaturated hydrocarbon.

10. The process of claim 1, wherein the ethylene conversion is greater than 28 wt %.

* * * * *